(12) United States Patent
Xiong et al.

(10) Patent No.: US 9,020,274 B2
(45) Date of Patent: Apr. 28, 2015

(54) METHOD OF INTEREST POINT MATCHING FOR IMAGES

(75) Inventors: Zhen Xiong, Fredericton (CA); Yun Zhang, Fredericton (CA)

(73) Assignee: University of New Brunswick, Fredericton, New Brunswick (CA)

( * ) Notice: Subject to any disclaimer, the term of this patent is extended or adjusted under 35 U.S.C. 154(b) by 383 days.

(21) Appl. No.: 12/775,240

(22) Filed: May 6, 2010

(65) Prior Publication Data

US 2010/0310177 A1     Dec. 9, 2010

Related U.S. Application Data

(60) Provisional application No. 61/175,934, filed on May 6, 2009.

(51) Int. Cl.
| | | |
|---|---|---|
| *G06K 9/46* | (2006.01) | |
| *G06T 7/00* | (2006.01) | |
| *G06K 9/62* | (2006.01) | |

(52) U.S. Cl.
CPC ............ *G06T 7/0032* (2013.01); *G06K 9/6211* (2013.01); *G06T 2207/10032* (2013.01); *G06T 2207/30181* (2013.01); *G06T 2207/30196* (2013.01)

(58) Field of Classification Search
None
See application file for complete search history.

(56) References Cited

U.S. PATENT DOCUMENTS

| | | |
|---|---|---|
| 3,726,591 A | 4/1973 | Helava et al. |
| 6,711,293 B1 | 3/2004 | Lowe |
| 2004/0184662 A1 | 9/2004 | Kravec et al. |
| 2009/0161946 A1* | 6/2009 | Sato et al. ..................... 382/154 |
| 2013/0307936 A1* | 11/2013 | Kim ............................... 348/47 |

FOREIGN PATENT DOCUMENTS

WO    WO 2008075061 A2 *  6/2008    ............... G06T 7/00

OTHER PUBLICATIONS

Xiaolong Dai; Khorram, S., "A feature-based image registration algorithm using improved chain-code representation combined with invariant moments," Geoscience and Remote Sensing, IEEE Transactions on , vol. 37, No. 5, pp. 2351,2362, Sep. 1999.*

Xiong, Z. (2009). Technical development for automatic aerial triangulation of high resolution satellite imagery. University of New Brunswick (Canada)). Retrieved from http://www2.unb.ca/gge/Pubs/TR268.pdf.*

Auer, Matin, Peter Regitnig, and Gerhard A. Holzapfel. "An Automatic Nonrigid Registration for Stained Histological Sections." IEEE Transactions on Image Processing, Apr. 2005, vol. 14, No. 4.

(Continued)

*Primary Examiner* — Nirav G Patel
(74) *Attorney, Agent, or Firm* — Engene F. Derényi; Fogler, Rubinoff LLP

(57) ABSTRACT

A computer implemented method for point matching comprising providing a pair of images captured, selecting first and second sets of interest points from the images; constructing a control network of super points for each set of interest points; assigning a position, with respect to the closest network control point of each control network, to other interest points on the images; locating conjugate points for each other interest point of each set based on its assigned position; and adding the conjugate points to the control network.

7 Claims, 27 Drawing Sheets

(56) References Cited

OTHER PUBLICATIONS

Belongie, Serge, Jitendra Malik, and Jan Puzicha. "Shape matching and object recognition using shape contexts." IEEE transactions on pattern analysis and machine intelligence, (2002), vol. 24.
Besl, Paul J., and Neil D. McKay, "A Method for Registration of 3-D Shapes." IEEE Transactions on Pattern Analysis and Machine Intelligence, (1992), vol. 14, No. 2.
Boffy, Aurelien, Yanghai Tsin, and Yakup Genc, "Real-Time Feature Matching Using Adaptive and Spatially Distributed Classification Trees." http://www.macs.hw.ac.uk/bmvc2006/papers/397.pdf. (2008).
Booksten, Fred L., "Principal Warps: Thin-Plate Splines and the Decomposition of Deformations." IEEE Transactions on Pattern Analysis and Machine Intelligence, (1989), vol. 11, No. 6.
Brown, Lisa Gottesfeld, "A survey of image registration techniques." ACM Computing Surveys, (1992), vol. 24, No. 4.
Caetano, Tiberio S., Terry Caelli, and Dante A.C. Barone, "A Comparison of Junction Tree and Relaxation Algorithms for Point Matching Using Different Distance Metrics." Technical Report TR 04-04, Feb. 2004, Department of Computer Science, University of Alberta.
Chui, Haili and Anand Rangarajan. "A New Point Matching Algorithm for Non-Rigid Registration." Computer Vision and Image Understanding 89 (2003) 114-141.
Cross, Andrew D.J. and Edwin R. Hancock. "Graph Matching With a Dual-Step EM Algorithm." IEEE Transactions on Pattern Analysis and Machine Intelligence, Nov. 1998, vol. 20, No. 11.
Demirci, M. Fatih, Ali Shokoufandeh, Sven Dickinson, Yakov Keselman, and Lars Bretzner. "Many-to-Many Feature Matching Using Spherical Coding of Directed Graphs." T. Pajdla and J. Matas (Eds.): ECCV 2004, LNCS 3021, pp. 322-335.
Dowman I. J., "Developments in Online Techniques for Photogrammetry and Digital Mapping." Photogrammetric Record, (1977), pp. 41-54, 9(49).
Gold, Steven and Anand Rangarajan, "A Graduated Assignment Algorithm for Graph Matching." IEEE Transactions on Pattern Analysis and Machine Intelligence, (1996), vol. 18, No. 4.
Gold, Steven, Anand Rangarajan, Chien-Ping Lu, Suguna Pappu, and Eric Mjolsness, "New Algorithms for 2D and 3D Point Matching: Pose Estimation and Correspondence." URL: http://citeseerx.ist.psu.edu/legacymapper?did=88372, (1997).
Gupta, Rajiv. "Linear Pushbroom Cameras." IEEE Transactions on Pattern Analysis and Intelligence, (1997), vol. 19, No. 9.
Habib Ayman and Rami Ai-Ruzouq, "Semi-Automatic Registration of Multi-Source Satellite Imagery with Varying Geometric Resolutions." Photogrammetric Engineering & Remote Sensing, (2005), pp. 325-332, vol. 71, No. 3.
Harris C. and Stephens M., "A combined corner and edge detector.", (1988), pp. 147-151, Alvey Vision Conference.
Kim, Taejung, "A Study on the Epipolarity of Linear Pushbroom Images." Photogrammetric Engineering & Remote Sensing, Aug. 2000, pp. 961-966, vol. 66, No. 8.
Kybic, Jan, and Michael Unser, "Fast Parametric Elastic Image Registration." IEEE Transactions on Image Processing, Nov. 2003, vol. 12, No. 11.
Lepetit, Vincent, Julien Pilet, and Pascal Fua. "Point Matching as a Classification Problem for Fast and Robust Object Pose Estimation." http://cvlab.epfl.ch/~vlepetit/papers/lepetit_cvpr04.pdf, (2004).
Lepetit, Vincent, Pascal Lagger, and Pascal Fua, "Randomized Trees for Real-Time Keypoint Recognition." Computer Vision and Pattern Recognition, 2005, pp. 775-781, vol. 2.
Lowe, David G., "Distinctive Image Features from Scale-Invariant Keypoints." International Journal of Computer Vision (2004), pp. 91-110, 60(2).
Masry, S. E., "An Automatic Method for Height Profile Determination." The Photogrammetric Record, (1972), pp. 728-730, vol. 7, Issue 42.
Mount, David M., Nathan S. Netanyahu, and Jacqueline Le Moigne, "Efficient Algorithms for Robust Feature Matching." Proceedings of the CESDIS Image Registration Workshop, NASA Goddard Space Flight Center, Greenbelt, MD, 1997.
Rexilius, J., S.K. Warfield, C.R.G. Guttmann, X. Wei, R. Benson, L. Wolfson, M. Shenton, H. Handels, and R. Kikinis, "A Novel Nonrigid Registration Algorithm and Applications." W. Niessen and M. Viergever (Eds.): MICCAI 2001, pp. 923-931, LNCS 2208.
Schmid, Cordelia, Roger Mohr and Christian Bauckhage, "Evaluation of Interest Point Detectors." International Journal of Computer Vision, (2000), pp. 151-172, 37(2).
Shokoufandeh, Ali, Yakov Keselman, Faith Demirci, Diego Macrini, and Sven Dickinson, "Many-to-Many Feature Matching in Object Recognition." H.I. Christensen and H.-H. Nagel (Eds.): Cognitive Vision Systems,(2006), pp. 107-125, LNCS 3948.
Terasawa, Kengo, Takeshi Nagasaki, and Toshio Kawashima, "Robust Matching Method for Scale and Rotation Invariant Local Descriptors and Its Application to Image Indexing.", G.G. Lee et al. (Eds.): AIRS 2005, pp. 601-615, LNCS 3689.
Tu, Zhuowen, Songfeng Zheng, and Alan Yuille, "Shape Matching and Registration by Data-Driven EM." Computer Vision and Image Understanding, (2008),pp. 290-304, 109.
Williams, John, and Mohammed Bennamoun, "Simultaneous Registration of Multiple Corresponding Point Sets." Computer Vision and Image Understanding, (2001), pp. 117-142, 81.
Yang, Gehua, Charles V. Steward, Michal Sofka, and Chia-Ling Tsai, "Registration of Challenging Image Pairs: Initialization, Estimation, and Decision.", IEEE Transactions on Pattern Analysis and Machine Intelligence, (2007), vol. 29, No. 11.
Zhao, Wanlei, Yugang Jiang, and Chong-Wah Ngo, "Keyframe Retrieval by Keypoints: Can Point-to-Point Matching Help?", H. Sundaram et al. (Eds.): CIVR 2006, pp. 72-81, LNCS 4071.
Zitova, Barbara, Jan Flusser, "Image Registration Methods: a Survey.", Image and Vision Computing 21 (2003), 977-1000.

\* cited by examiner

METHOD OF INTEREST POINT MATCHING FOR IMAGES

CROSS REFERENCE TO RELATED APPLICATIONS

This application claims the benefit and priority under 35 U.S.C. 119(e) to U.S. Provisional Patent Application No. 61/175,934 filed May 6, 2009.

FIELD

This invention relates to image processing in general, and methods of interest point matching in particular.

BACKGROUND

Interest point matching refers to the process of matching two sets of features on a pair of images and finding correspondences between them. Matching interest points (sometimes called feature points or key points) is a key requirement for image registration. Image registration is widely used in 3D shape reconstruction, change detection, photogrammetry, remote sensing, computer vision, pattern recognition and medical image processing [Brown, 1992; Zitova and Flusser, 2003]. Such applications have a number of common characteristics: a) the images they deal with have no baseline or a short baseline; b) the images are normally processed in a short time; and c) feature-based algorithms are widely used.

Unfortunately, there are still many challenges with interest point matching. Although numerous algorithms have been developed for different applications, processing local distortion inherent in images that are captured from different viewpoints remains problematic. High resolution satellite images are normally acquired at widely spaced intervals and typically contain local distortion due to ground relief variation. Interest point matching algorithms can be grouped into two broad categories: area-based and feature-based. In remote sensing, area-based algorithms are normally suitable for open terrain areas but the feature-based approaches can provide more accurate results in urban areas. Although each type has its own particular advantages in specific applications, they both face the common problem of dealing with ambiguity in smooth (low texture) areas, such as grass, water, highway surfaces, building roofs, etc. Feature-based algorithms face the additional problem of the effect of outliers (points with no correspondences) on the results [Zitova and Flusser, 2003].

Because of the large number of feature-based algorithms used in interest point matching, there are many classification methods for describing these algorithms. Normally feature-based algorithms can be categorized into rigid and non-rigid (according to the transformation between images), and global and local (according to the image distortions), or corrected and uncorrected (according to the image variations). In addition, most of the feature-based algorithms search for correspondences and also address the refinement of a transformation function. Therefore, feature-based algorithms can also be grouped into three additional categories [Chui and Rangarajan, 2003]. They either solve the correspondence only, solve the transformation only, or solve both the correspondence and the transformation.

Although numerous feature based algorithms have been developed, there is no general algorithm which is suitable for a variety of different applications. Every method must take into account the specific geometric image deformation [Zitova and Flusser, 2003]. The first category of algorithms processes the global distortions. The ICP (Iterative Closest Point) algorithm is a classical global algorithm [Besl and McKay, 1992; Yang et al., 2007]. Because this algorithm requires the assumption that one surface is a subset of the other, it is only suitable for global distortion image registration [Williams and Bennamoun, 2001]. For medical image registration and pattern recognition, many rigid global transformations are used [Besl and McKay, 1992; Mount et al., 1997; Tu et al., 2008]. The B-Spline and TPS (Thin Plate Spline) deformation model is a common model for global distortion in medical image registration [Booksten, 1989, Kybic and Unser, 2003].

The second category of algorithms deals with the local distortions. For non-rigid local distortions, more complicated transformations are developed. TPS was proposed initially for global transformations, but it was improved for smooth local distortions for medical image registration [Gold et al., 1997; Chui and Rangarajan, 2003; Auer et al., 2005]. Another common local distortion model is the elastic deformation model [Auer et al., 2005; Rexilius et al., 2001].

Some algorithms do not need a transformation function. In computer vision systems and pattern recognition, feature descriptors extracted from an image's gray values are usually used [Belongie et al., 2002; Kaplan et al., 2004; Terasawa et al., 2005; Lepetit et al., 2005; Zhao et al., 2006]. SIFT (Scale Invariant Feature Transform) is one of the best descriptors for interest point matching [Lowe, 2004]. In graph matching algorithms, the topological relationship is the key feature and is widely used in pattern recognition [Gold and Rangarajan, 1996; Cross and Hancock, 1998; Demirci et al., 2004; Caetano et al., 2004; Shokoufandeh et al., 2006]. Another idea is to consider interest point matching as a classification problem. The features from the reference image are used to train the classifier [Lepetit et al., 2004; Boffy et al., 2008].

Although many of the feature-based algorithms described above are useful in solving problems for specific applications, they have four common drawbacks: 1) The features cannot be exactly matched, because of the variations of features between different images; 2) Outliers are difficult to reject [Chui and Rangarajan, 2003]; 3) For local image distortion, high dimensional non-rigid transformations are required, and a large number of correspondences are needed for the refinement of mapping functions [Brown, 1992], but too many features will make the feature matching more difficult; and 4) The feature description should fulfill several conditions, the most important ones being invariance (the descriptions of the corresponding features from the reference and sensed image have to be the same), uniqueness (two different features should have different descriptions), stability (the description of a feature which is slightly deformed in an unknown manner should be close to the description of the original feature), and independence (if the feature description is a vector, its elements should be functionally independent). Usually these conditions cannot be satisfied simultaneously and it is necessary to find an appropriate trade-off [Zitova and Flusser, 2003].

Images in photogrammetry and remote sensing contain local distortions caused by ground relief variations and differing imaging viewpoints. Because of their stability and reliability, area-based methods are usually used in remote sensing for interest point matching. Photogrammetric scientists are always attempting to improve the stability and reliability of interest point matching techniques. Hierarchical matching and relaxation algorithms are typical examples of such attempts. At the same time, great efforts are also being made to reduce the search area and increase the matching speed. The use of epipolar geometry is one of the most important achievements of such work [Masry, 1972; Helava, et al., 1973; Dowman, 1977; Gupta, 1997; Kim, 2000]. Despite the progress that has been made, area-based methods still have many drawbacks. The main limitations can be summarized as follows: 1) The rectangular image window is only suitable for image distortion caused by translation (in theory); 2) These methods cannot process smooth areas (areas without prominent texture); and 3) The methods are sensitive to image intensity changes which are caused by noise, varying illumination and the use of different sensors [Zitova and Flusser, 2003].

SUMMARY

In one aspect, the invention relates to a method for avoiding local minimum problems and to process areas without prominent details, because the proposed method uses spatial information by first constructing a super point control network. This method also removes outliers easily, because every interest point is assigned a unique position and angle with regard to its closest control point. Because of the super point control network, this method does not require an exhaustive search during the interest point matching.

In another aspect, the invention relates to a method of interest point matching for digital images involving an interest point matching algorithm, in which "super points", those points which have an interest strength (for example, points which represent relatively prominent features), are extracted first. A control network is then constructed using these super points. Next, each remaining interest point is assigned a unique position with regard to the closest control network point. Finally an iterative "closest point" algorithm is applied to search for correspondences (conjugate point) based on the position that has been assigned to each interest point. After each iteration, the new correspondences are added to the control network as new leaves. The control network therefore gradually becomes larger and denser. The iterations continue until no more correspondences are found. Because every point is located in a unique position relative to the control network, this method avoids the problem of how to deal with local minimums.

In a further aspect, the invention relates to a computer implemented method for point matching comprising (a) providing a pair of images captured; (b) selecting first and second sets of interest points from the images; (c) constructing a control network of super points for each set of interest points; (d) assigning a position, with respect to the closest network control point of each control network, to other interest points on the images; (e) locating conjugate points for each other interest point of each set based on its assigned position; and (f) adding the conjugate points to the control network.

Optionally, steps (d) to (f) can be repeated.

As an option, the set of interest points can be image points which have an interest strength greater than a specified threshold.

As yet another option, the conjugate points can be tie points.

As another option, the method can further include selecting a first start point and a first root point from the first set wherein the other points of the first set are leaf points; calculating a first distance between the first start point and the first root point; selecting a second start point and a second root point from the second set wherein the second start point and the second root point are selected such that the distance between them is closest to the first distance; and wherein assigning a position to the other points can further comprise assigning a relative position and angle to each other point (leaf point) of each network by calculating a distance between each leaf point of the set and the root point of the set; and calculating, for each leaf point of the set, an angle from a line formed by the start point of the set and the root point of the set, to a line formed by the leaf point and the root point of the set for each control network, grouping each interest point from a set with the closest node of the control network by constructing a sub-control network for each network with the closest node and the interest points grouped with the node; and conducting interest point matching between the two sub-control networks.

As a still further option, the method can further comprise selecting the interest points with the smallest relative position and angle as tie points and a Harris algorithm can be used.

In another aspect, the invention relates to a computer implemented method for point matching for a pair of images comprising (a) constructing two control networks using points from the images; (b) assigning a relative position to control network points; (c) conducting a correspondence search for points of the control networks; (d) selecting a root and a start point for each control network wherein the root is the point within the network with the most number of correspondences; (e) grouping interest points; (f) constructing a sub-control network from each control network; (g) assigning a relative position to sub-control network points; and (h) generating a further control network.

Optionally, step (a) can further comprise receiving first and second super point sets; selecting a super point from each super point set as a root; and constructing a control network for each super point set; step (b) can further comprise selecting a leaf for the first control network wherein the leaf is a starting point; using the distance between the root and the leaf in the second control network to determine a corresponding starting point in the other network; and assigning a relative position (distance between root and leaf) and an angle (clockwise from the starting point) to points in each of the control networks; step (c) can further comprise locating a corresponding point in the second control network for every leaf point in the first control network; and selecting tie points wherein the tie points are the closest points with the smallest position differences and the smallest angle differences and where the differences are less than corresponding thresholds; steps (a) to (c) can be repeated in iterations; step (d) can further comprise using a K-Means clustering method to group interest points with the closest node of the control network; step (f) can further comprise, for each control network, taking a node as the root together with all the interest points grouped with it and selecting its father node as the starting point, with the closest node of the control network; step (g) can further comprise, for every interest point in each control network, assigning a relative position and angle to the point with respect to the closest control network point; step (h) can further comprise performing interest point matching between the two sub-control networks whose root nodes are correspondences wherein correspondences are defined as those interest points with the minimum difference in position and angle, adding new correspondences to each control network to construct a larger network; and iterating until no new correspondence is added to each control network.

DETAILED DESCRIPTION OF THE PREFERRED EMBODIMENTS

In one embodiment of the invention, an algorithm first detects and extracts super points, which have the greatest interest strength (i.e. those points which represent the most prominent features). A control network can then be constructed based on these super points. This control network, like a sketch, can then control the entire image, and ambiguities in the homogeneous areas can be avoided. Next, every point in the image is assigned a unique position and angle relative to the closest super point in the control network. Finally, for interest point matching, those points with the smallest position and angle differences are the correspondences. The correspondences are then added to the control network to construct a bigger and stronger control network. The process is continued until no more correspondences are found. The algorithm proposed in this paper includes three parts: 1) super point detection; 2) super point matching; and 3) interest point matching.

Super Point Detection

The Harris detector, a well-known interest point detection algorithm, can be used in to detect and extract the super points and interest points. The Harris algorithm determines whether or not a point is a corner based on the Harris matrix A at the point P(x, y).

$$A = \begin{bmatrix} \langle I_x^2 \rangle & \langle I_x I_y \rangle \\ \langle I_x I_y \rangle & \langle I_y^2 \rangle \end{bmatrix} \quad \text{(Eq. 1)}$$

where the angle brackets denote averaging (summation over the image patch around the point P(x, y)).

The interest strength is determined based on the magnitudes of the eigenvalues ($\lambda_1$ and $\lambda_2$) of A. Because the exact computation of the eigenvalues is computationally expensive, the following function $M_c$ was suggested by Harris and Stephens [1988] as the interest strength:

$$M_c = \det(A) - \kappa \operatorname{trace}^2(A) \quad \text{(Eq. 2)}$$

Figure 1:
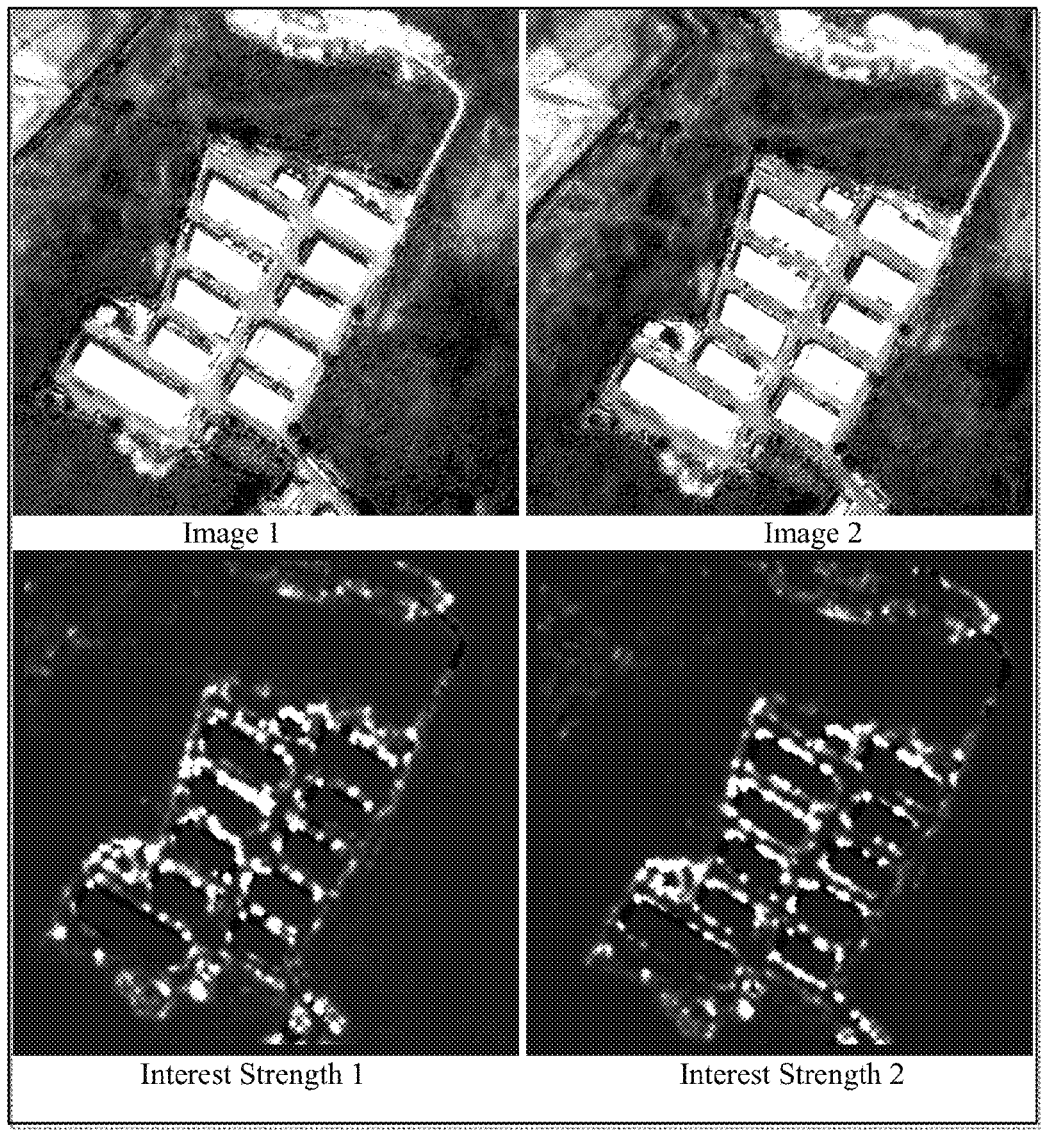
FIG. 1 is a group of original images (above) and their corresponding interest strength (below).
Figure 2:
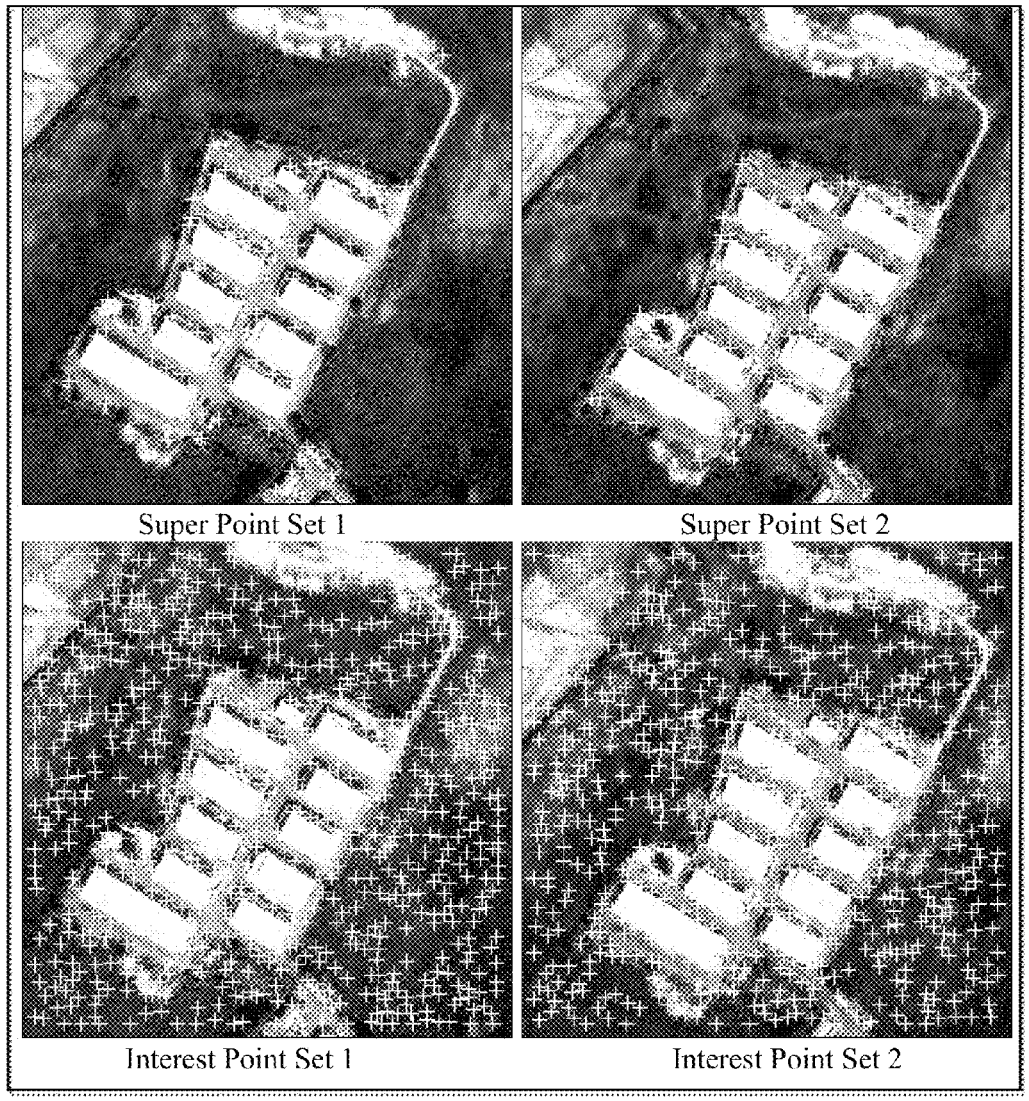
FIG. 2 is a group of images showing extracted super points (above) and their corresponding interest points (below) according to an embodiment of the method of the invention.

The value of κ has to be determined empirically, and in the literature values in the range 0.04 to 0.06 have been reported as feasible [Schmid et al., 2000]. If Mc>0, it is a corner, otherwise, it is not a corner. Obviously, the corner should be the point with the local maximum value of Mc. By calculating the interest strength Mc over whole image, an image which shows the interest strength can be obtained. FIG. 1 shows two original images and their corresponding interest strength shown below each image. The brightness is directly proportional to the interest strength. Two thresholds TA and TB can be set with TA>TB for the interest point detection and super point detection. The point with an interest strength greater than the threshold TB and also representing the local maximum, can be extracted as an interest point. If the interest strength of such point is greater than the threshold TA and its interest strength is a local maximum, then a super point is detected. FIG. 2 shows extracted super points and their corresponding interest points. There are 99 super points in Super Point Set 1 and 737 interest points in Interest Point Set 1. There are 111 super points in Super Point Set 2 and 707 interest points in Interest Point Set 2. Like most other interest point matching processes, super point matching is an exhaustive search process, so the number of super points should be limited to an acceptable range.

Super Point Matching

Figure 3:
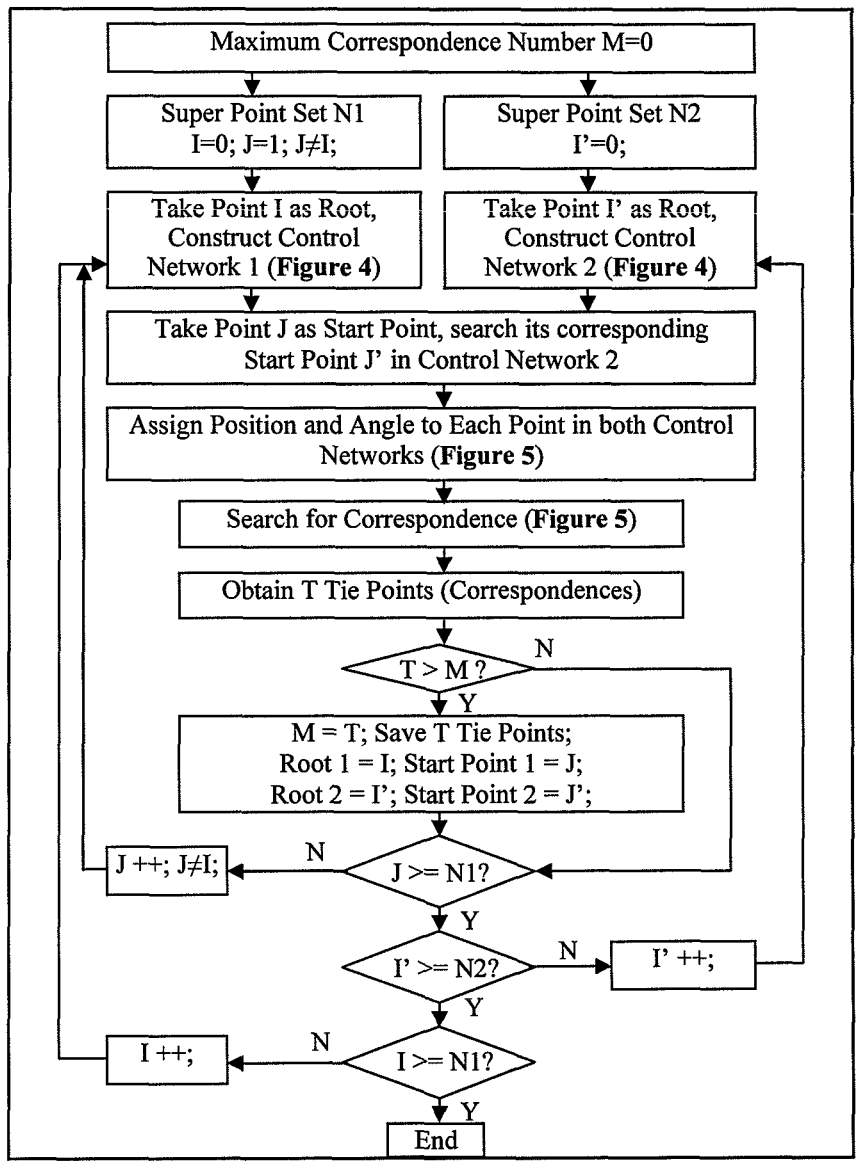
FIG. 3 is a flow chart showing the super point matching procedure according to an embodiment of the method of the invention.

The goal of the super point matching is to find a root from each super point set and identify the first group of correspondences (tie points). As shown in FIG. 3, the super point matching consists of three steps: 1) Control network construction; 2) Assignment of relative positions and angles; and (3) Correspondence searching.

Figure 4:
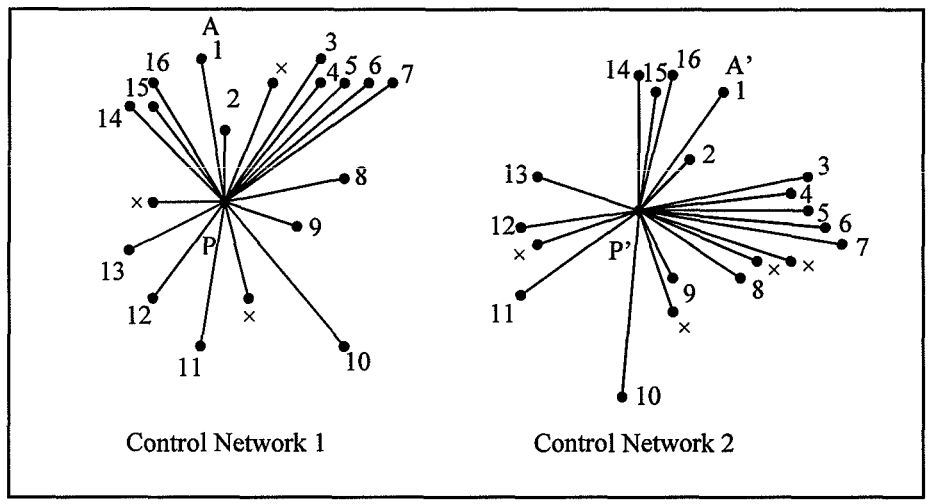
FIG. 4 is a diagram of a control network constructed with super points according to an embodiment of the method of the invention.

In Step 1, a super point from each super point set is selected as a Root, and a control network is constructed. One control network is constructed for each super point set. FIG. 4 shows a control network constructed with super points. P and P' are roots, and the others are leaves. A and A' are start points. Sixteen tie points (correspondences) are obtained after super point matching. "x" denotes an outlier.

Step 2 includes three stages:

(1) A leaf from control network 1 is selected randomly as the starting point. The distance between the starting point and the root is denoted as S.

(2) The corresponding starting point in control network 2 is determined according to the distance between the root and the leaf. The leaf point of control network 2 with the closest distance to S is selected as the corresponding starting point in control network 2.

(3) After the two starting points for both control networks have been determined, the relative positions (distance between root and leaf) and angles (clockwise from the starting point) are assigned to every point in both control networks.

Figure 5:
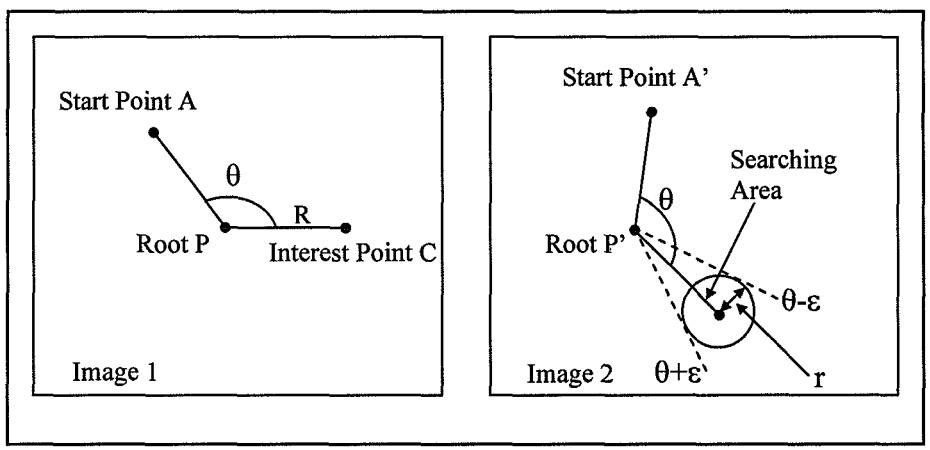
FIG. 5 is a diagram showing relative position (R) and angle (θ) assignment (Image 1), and a correspondence search (Image 2) according to an embodiment of the method of the invention. After the root and start points are determined, every point (e.g. C) can be assigned a relative position (R) and angle (θ) (Image 1). The closest candidate in the searching area is the correspondence (Image 2).

FIG. 5 is a diagram showing relative position (R) and angle (θ) assignment (Image 1), and a correspondence search (Image 2). After the root and start points are determined, every point (e.g. C) can be assigned a relative position (R) and angle (θ) (Image 1). The closest candidate in the searching area is the correspondence (Image 2).

Correspondence searching commences in Step 3. After each point in both control networks has been assigned a relative position and angle, a corresponding point in control network 2 may be found for every leaf point in control network 1 according to their positions and angles based on the following function:

$$\text{correspondence} = \text{Min}\left(\sum_{i=1}^{m-1}\sum_{j=1}^{n-1}\text{abs}(Pi-P'j)\right)\text{Min}\left(\sum_{i=1}^{m-1}\sum_{j=1}^{n-1}\text{abs}(\theta_{Pi}-\theta_{P'j})\right) \quad \text{(Eq. 3)}$$

Where, m and n denote the number of leaves in control network 1 and control network 2 respectively; Pi and P'i are relative distances between root and leaf in the two control networks; and $\theta_{Pi}$ and $\theta_{P'i}$ are relative angles between starting point and leaf in the two control networks.

The closest points with the smallest position differences and smallest angle differences, where both differences are less than their corresponding thresholds, will be selected as tie points (correspondences). Otherwise, if a point does not have a correspondence, it is an outlier, as shown in FIG. 4.

Every super point can be either the root or the starting point. After super point matching, a number of correspondences are obtained. When the maximum possible number of correspondences is obtained, the corresponding root and starting points will be the final root and starting points of the super point control network.

Only image shift and image rotation are considered when interest points are matched by determining the root and the starting point. This is acceptable because for high resolution satellite images with narrow fields of view, affine transformations can accurately simulate the geometric distortion between two images [Habib and Ai-Ruzouq, 2005].

The process of super point matching is an iterative and exhaustive search process. Every point can be either a root or a starting point. For example, in FIG. 8 there are 20 super points in super point set 1 and 21 super points in super point set 2. Therefore, there are $C_{20}^1 C_{21}^1$ combinations for root selection, $C_{19}^1 C_{20}^1$ combinations for starting point selection, and $C_{18}^1 C_{19}^1$ combinations for the correspondence search. So there will be $C_{20}^1 C_{21}^1 C_{19}^1 C_{20}^1 C_{18}^1 C_{19}^1 = 54583200$ combinations in total. Therefore, in order to avoid combination explosion and reduce the matching time, the number of super points should be limited to an acceptable range.

Figure 6:
FIG. 6 is an image of the result of super point matching-control networks with 41 correspondences according to an embodiment of the method of the invention.

After super point matching, a control network which consists of all the extracted correspondences is obtained. FIG. 6 is an image showing the result of super point matching-control networks with 41 correspondences.

Interest Point Matching

Figure 7:
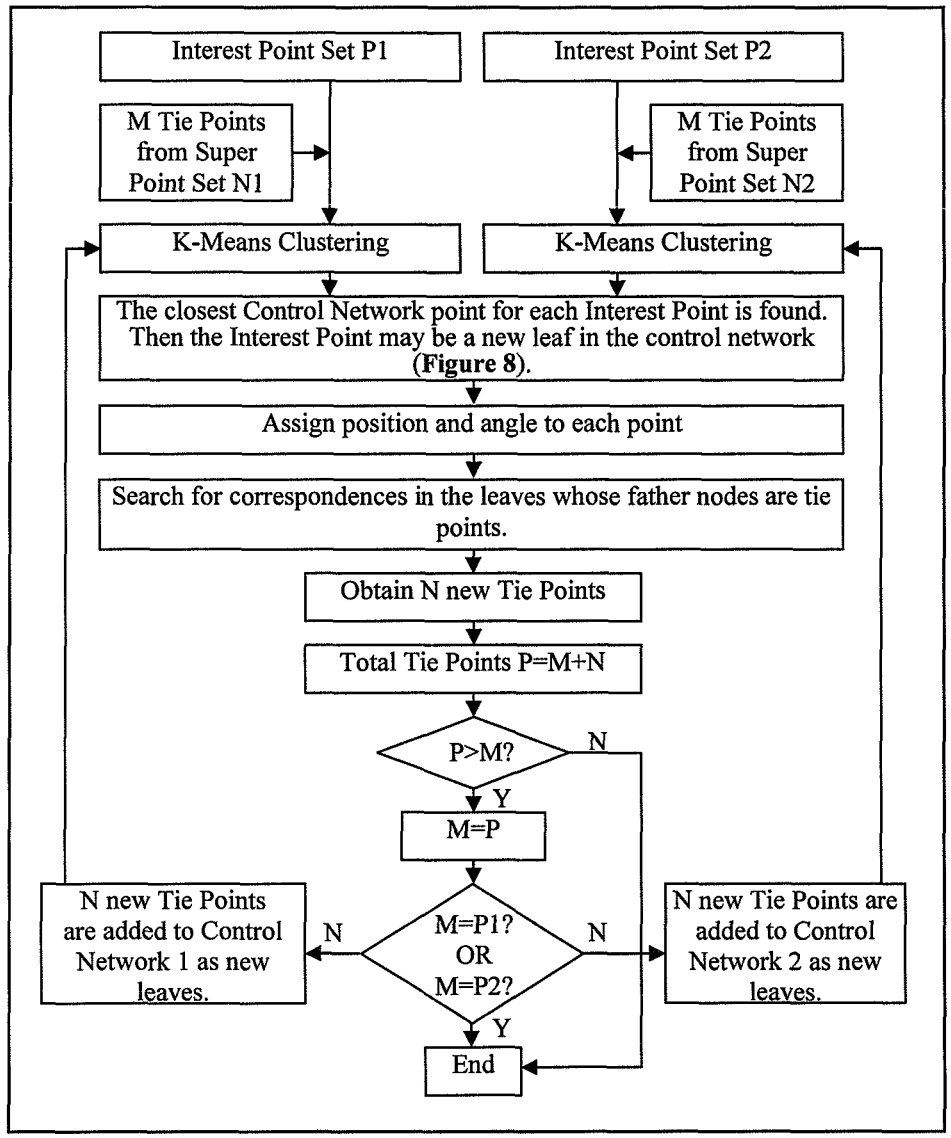
FIG. 7 is a flow chart of interest point matching according to an embodiment of the method of the invention.
Figure 8:
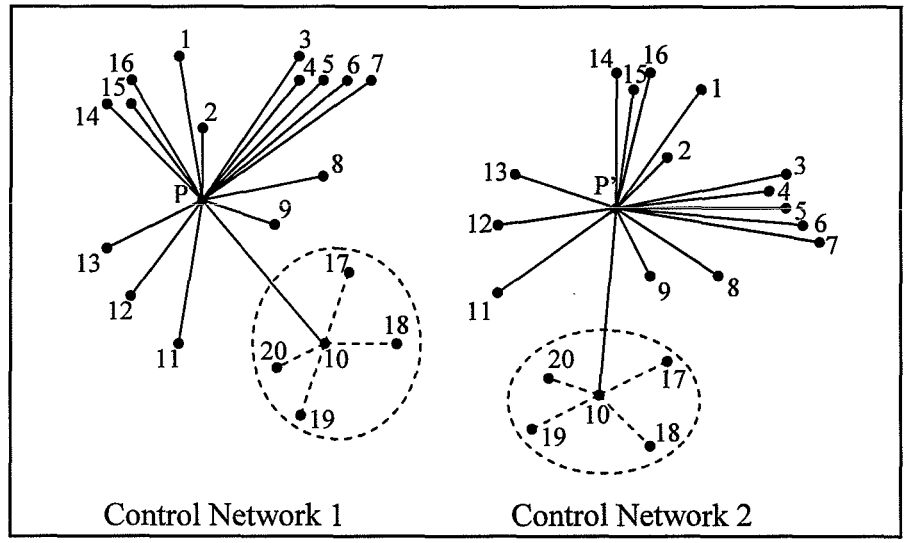
FIG. 8 is a diagram of a sub-control network according to an embodiment of the method of the invention.

After the super point matching, two control networks corresponding to the two interest point sets are obtained. Under the control of the super point network, interest point matching becomes simple. FIG. 7 shows a flowchart of the interest point matching process, which includes four steps. First, through a process of K-Means clustering, every interest point can be grouped with the closest node of the control network. For example, as shown in FIG. 8, the interest points 17, 18, 19, and 20 in the circle are grouped with the closest control network point "10". Then, taking node "10" as the root, together with all the interest points grouped with it (17, 18, 19, 20) and node 10's father node P, a sub-control network is constructed. The father node P will be the starting point in the sub-control network. Interest point matching is performed between two sub-control networks whose roots are correspondences (Tie Points). Next, every point in this sub-control network is assigned a position and angle with respect to node "10" and the starting point "P". In this way, every interest point is assigned a relative position and angle with respect to its closest control network point. Finally, interest point matching is performed between the two sub-control networks whose root nodes are correspondences. Correspondences are defined as those interest points with the minimum difference in position and angle. The new correspondences are added to the control network to construct a bigger network. This is an iterative process that continues until no new correspondence is added to the control network. The final control network is the result of interest point matching.

Threshold Selection

In the process of interest point matching, it is crucial to set a suitable threshold for the position and angle differences. In remote sensing and photogrammetry, the images always contain complicated local distortions because of the long baselines (long distance between images) and ground relief variations. In such a situation, the effective ground distance for different sensors will vary with changes in ground relief, incidence angle and sensor position.

Figure 9:
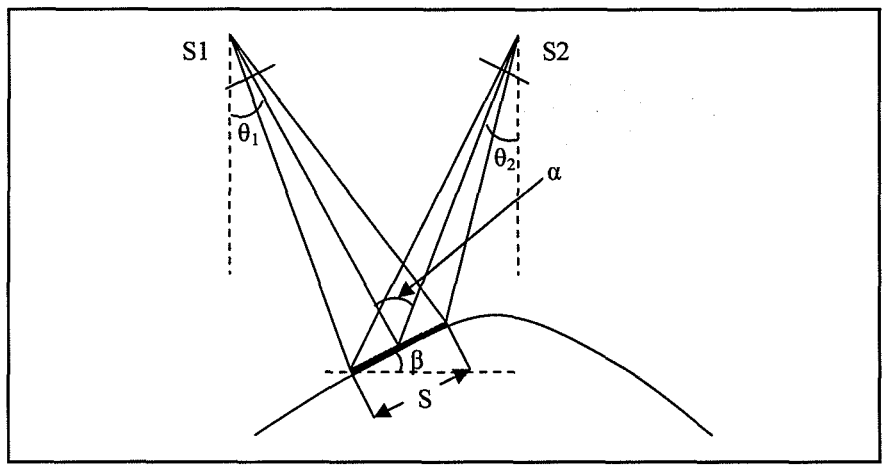
FIG. 9 is a diagram depicting the image distance difference caused by ground relief variation according to an embodiment of the method of the invention.

For example, in FIG. 9, a distance S on the ground with a slope β is acquired by two sensors S1 and S2 with incidence angles θ1 and θ2 respectively.

The distance difference caused by ground relief variation in such a case can be defined as follows:

$$ds = s[\cos(\theta_1-\beta)-\cos(\theta_2+\beta)] \quad \text{(Eq. 4)}$$

Where ds is the distance difference caused by the ground relief variation; $\theta_1$, $\theta_2$ are the incidence angles of sensor S1 and sensor S2 respectively; $\beta$ is the slope of the ground; and S is the ground distance.

Figure 10:
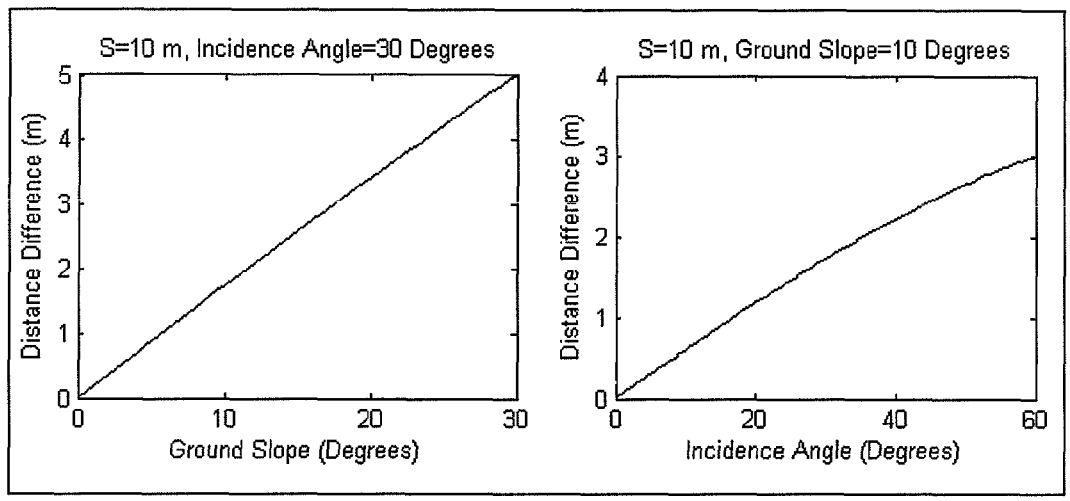
FIG. 10 is graphs of image distance difference versus ground slope and incidence angle according to an embodiment of the method of the invention.

Obviously, the distance difference can vary with ground slope and incidence angle. As shown in the graphs in FIG. 10, the distance difference changes with the incidence angle and ground slope (assuming that the forward incidence angle $\theta_1$ equals the backward incidence angle $\theta_1$).

The distance difference is proportional to the ground slope and the incidence angle. For an image pair, the incidence angles are constants, so the ground slope is the only variable. In an image, the slope varies with the ground relief variation. Therefore, the only way to limit the distance difference between two images is to limit the ground distance. A small ground distance will lead to a small distance difference and vice-versa. That is why in the interest point matching algorithm, all interest points should be grouped with their closest control network points.

It is important to determine the best way to select the threshold for the distance difference and angle difference. Obviously, a large threshold will increase the number of false matches, so in order to reduce false matches, the threshold should preferably be set as small as possible, but when the distance difference between two images is large, a small threshold may mean that correspondences are over-looked and more iterations may be needed to find matches. Another concern may be that a small threshold may lead to false matches and exclude the correct correspondence. This is possible, but because the interest point is a local maximum, there is only a small probability that in the small search area there is another local maximum and the correct one is farther away from the search area. The threshold can therefore be set by considering the radius of the local maximum. For example, if the local maximum is contained in a 5 by 5 pixel window, a threshold of 2 pixels or less can be considered as a safe threshold.

Experiments

Four sets of high resolution satellite images were used.

Figure 11:
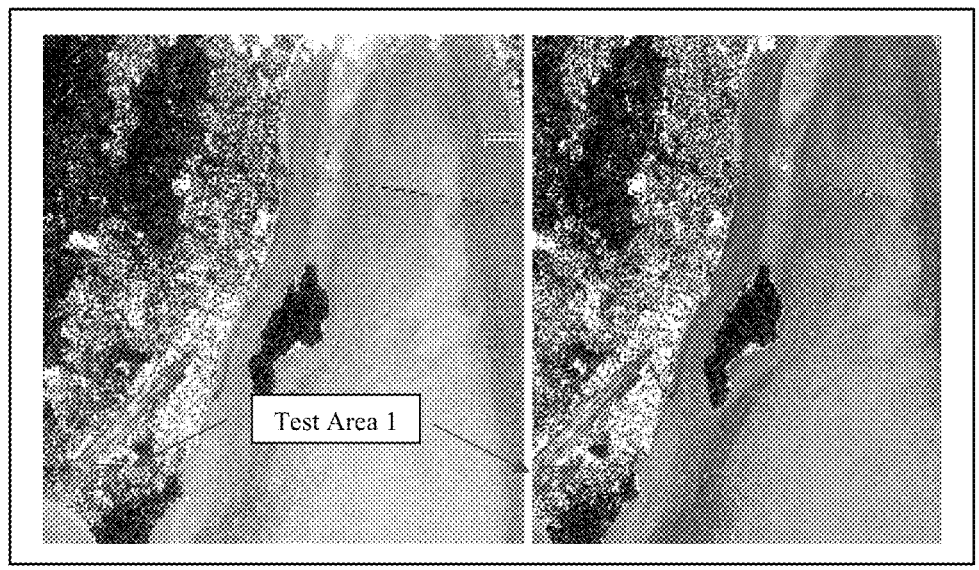
FIG. 11 is a stereo pair of IKONOS images of Penang, Malaysia (From CRISP, National University of Singapore).
Figure 12:
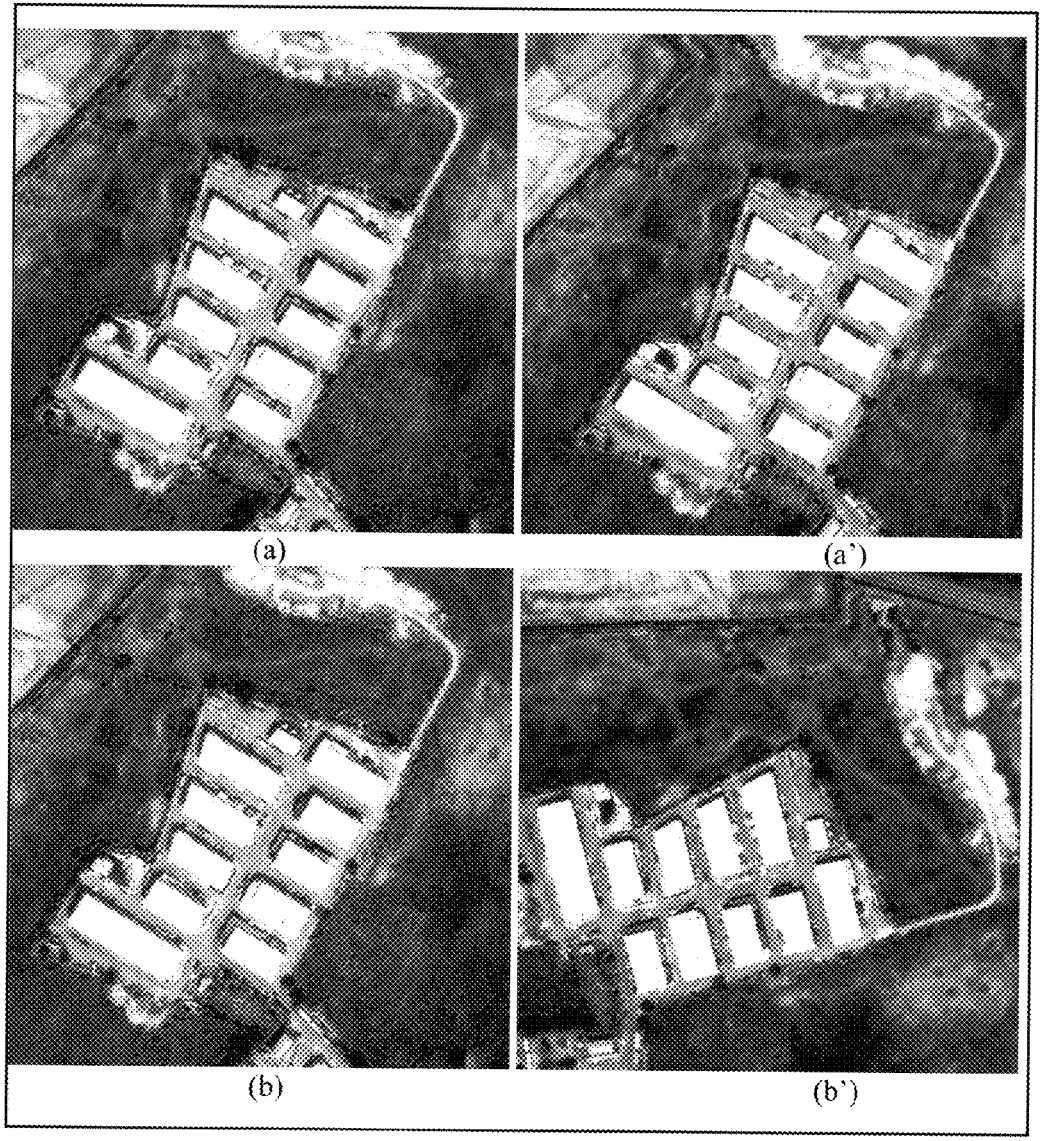
FIG. 12 is a set of test images taken from the Penang Stereo Pair.
Figure 13:
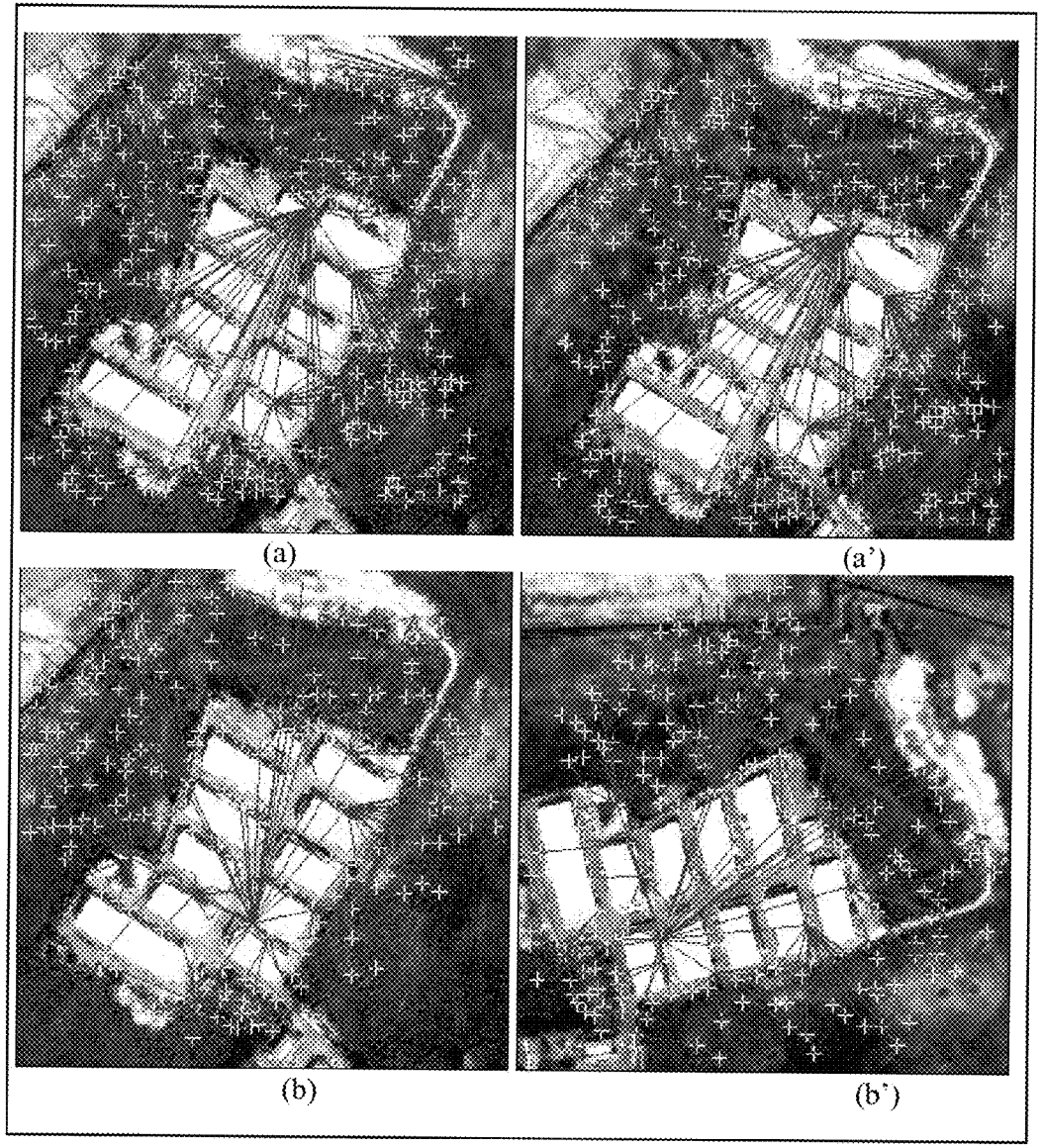
FIG. 13 is a set of images showing the results of interest point matching corresponding to the image pairs from FIG. 12 according to an embodiment of the method of the invention.

Test Data 1:

As shown in FIG. 11, a stereo pair of level 1A IKONOS images was acquired on Jun. 25, 2004, over Penang, Malaysia. The incidence angles are 30° and 3.5° respectively. A rectangular area (400 by 400 pixels) was selected as the test area. FIG. 12 shows two pairs of images. The pair (a) and (a') were taken directly from the original images without rotation. A second pair (b) and (b') is comprised of (b) which was taken from the original left image and (b') which was taken from the right image which has been rotated 45°. In this test area, there is large area of grass which was used to test the algorithm's capability of reducing ambiguity and avoiding false matching in a smooth area. FIG. 13 shows the results of interest point matching corresponding to the image pairs from FIG. 12 (a), (a') and FIG. 12 (b), (b') respectively. The pair (a) and (a') shows 410 correspondences and the pair (b) and (b') shows 264 correspondences.

Figure 14:
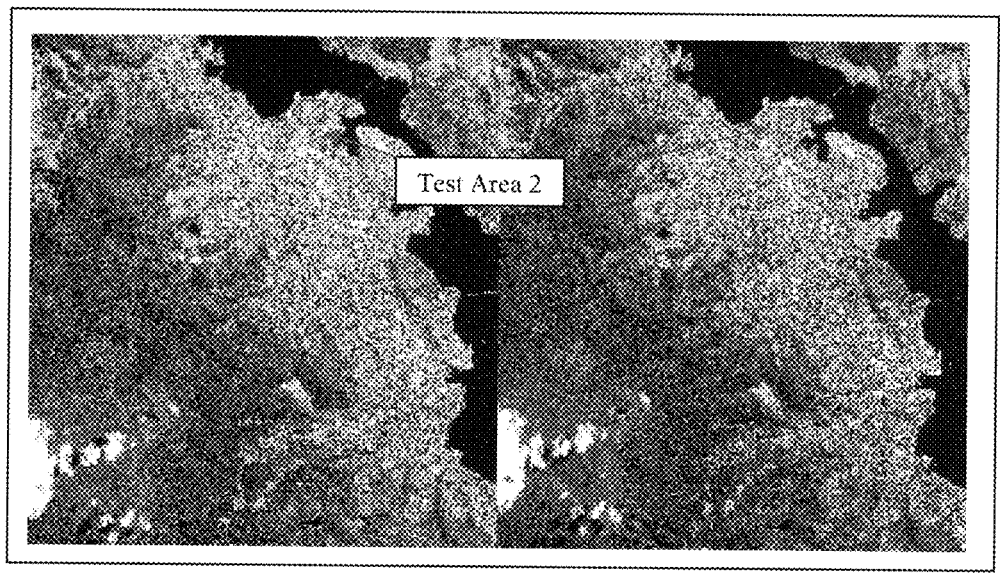
FIG. 14 is a stereo pair of IKONOS images in Hobart, Australia (From the University of Melbourne).

Test Data 2:

As shown in FIG. 14, a stereo pair of IKONOS images which was acquired on Feb. 22, 2003, in Hobart, Australia. The incidence angles are forward 75° and backward 69° respectively (Fraser and Hanley, 2005).

Figure 15:
FIG. 15 shows test images from the Hobart Stereo Pair according to an embodiment of the method of the invention.

A rectangular area (400 by 400 pixels) was selected as the test area. FIG. 15 shows two pairs of images: (c) and (c') are a test image pair (400 by 400 pixels) taken directly from the original images without rotation, while (d) and (d') is another test image pair (400 by 400 pixels) where (d) was taken directly from the original left image and (d') was taken from the right image which has been rotated 315°. This is an urban area with a large area of grass where the algorithm's capability of reducing ambiguity and avoiding false matching in smooth areas could be tested.

Figure 16:
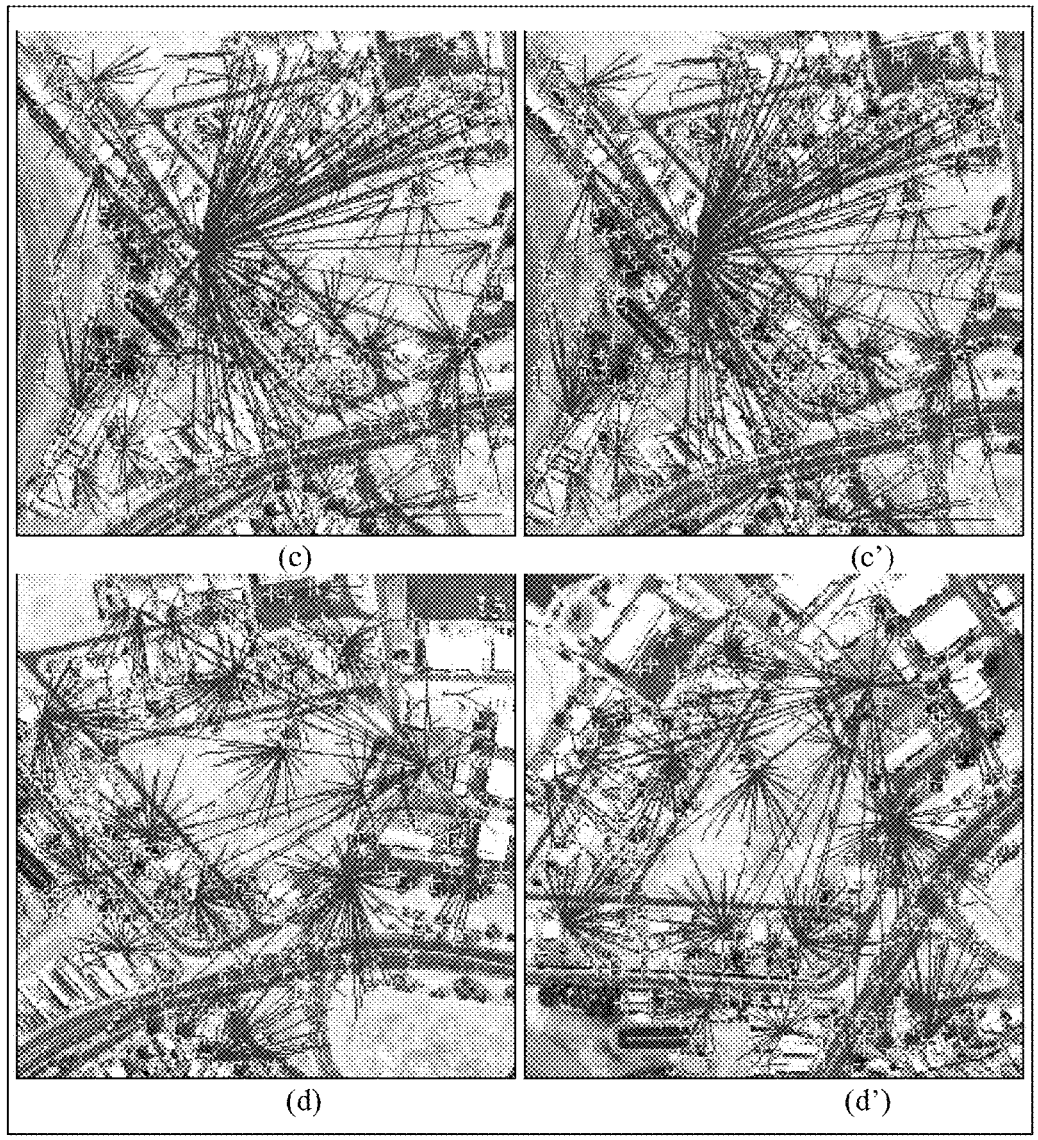
FIG. 16 is a set of images showing the results of interest point matching corresponding to the image pairs from FIG. 15 according to an embodiment of the method of the invention.

FIG. 16 shows the results of interest point matching corresponding to the image pairs from FIG. 15 (c), (c') and FIG. 15 (d), (d') respectively. The image pair (c) and (c') show 641 correspondences and the image pair (d) and (d') show 561 correspondences.

Figure 17:
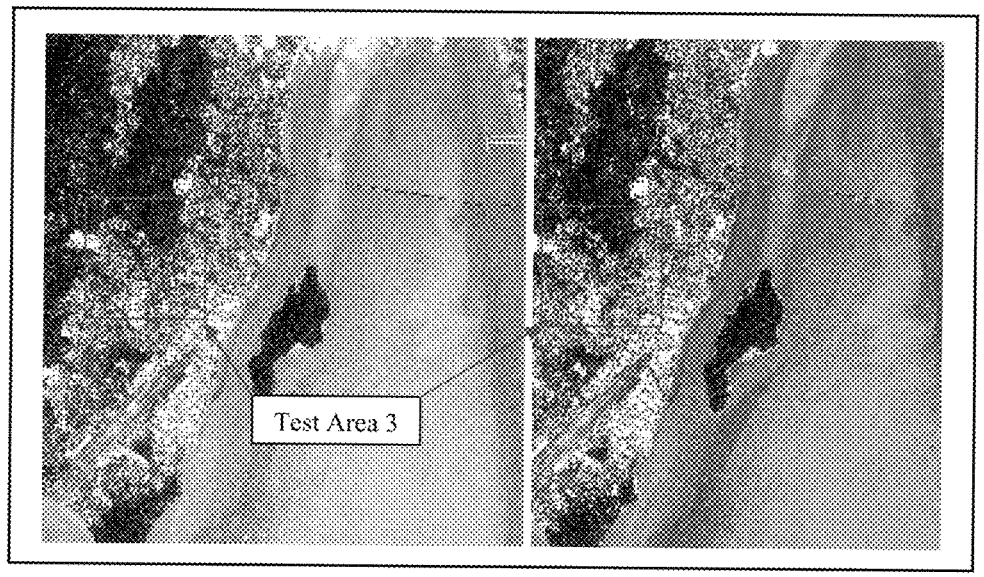
FIG. 17 is a stereo pair of IKONOS images of Penang, Malaysia (From CRISP, National University of Singapore).

Test Data 3:

FIG. 17 shows test area 3, which was also taken from the stereo image pair in Penang. Because the above two test areas are relatively flat and somewhat small, a larger test area from a mountainous area was selected as test area 3 in order to test the algorithm under a different set of conditions.

Figure 18:
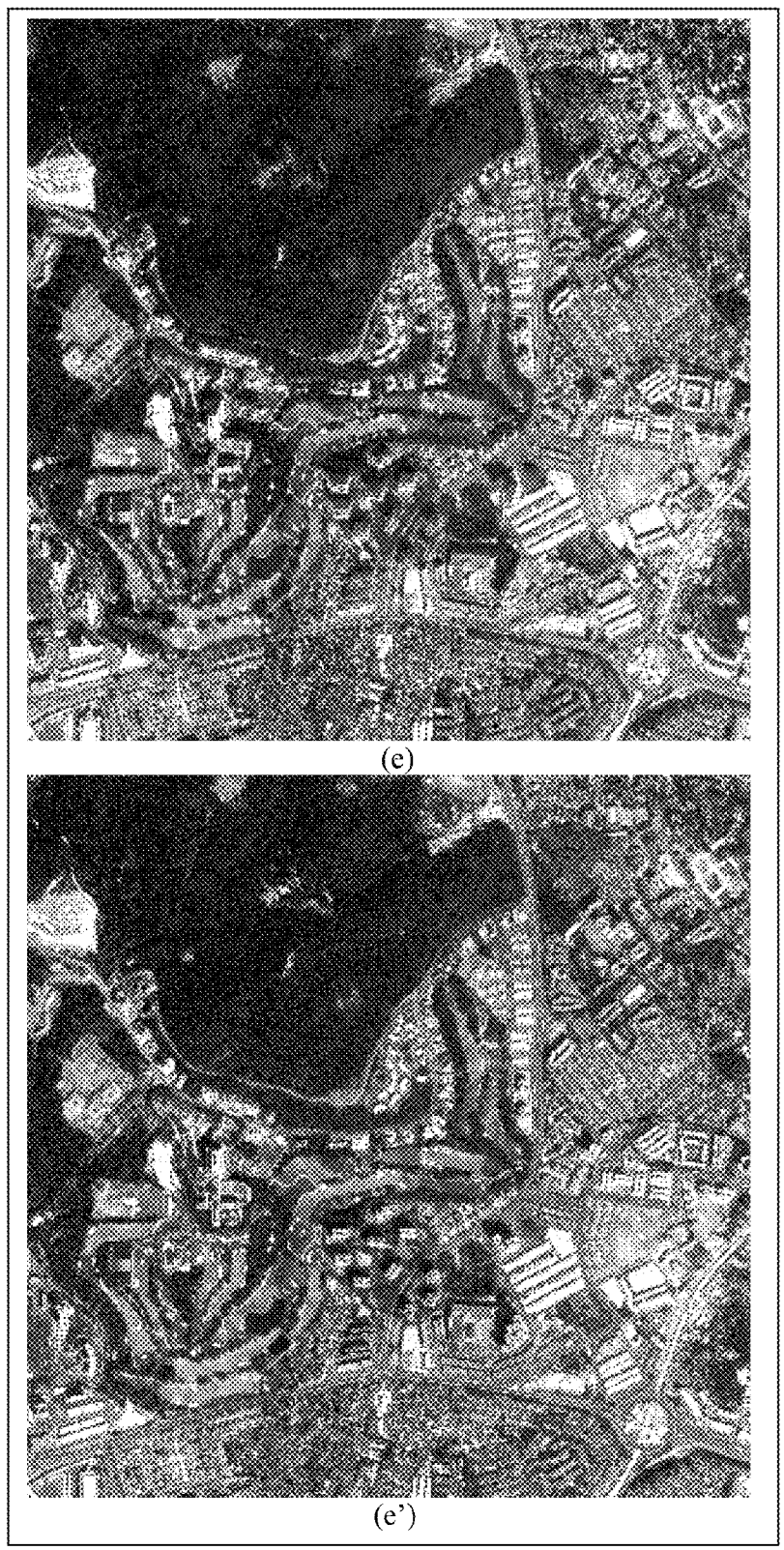
FIG. 18 is an image of test Area 3 in a mountainous area (2000 by 2000 pixels).

A rectangular area (2000 by 2000 pixels) was selected as test area 3. FIG. 18 shows image pair (e) and (e'), taken directly from the original images. This is a mixed area of mountain and urban land cover. In this test area, there is large area of forest which was used to test the algorithm's capability of reducing ambiguity and avoiding false matching in a smooth area. The mountainous area was used to test the algorithm's capability of processing large distortions.

Figure 19:
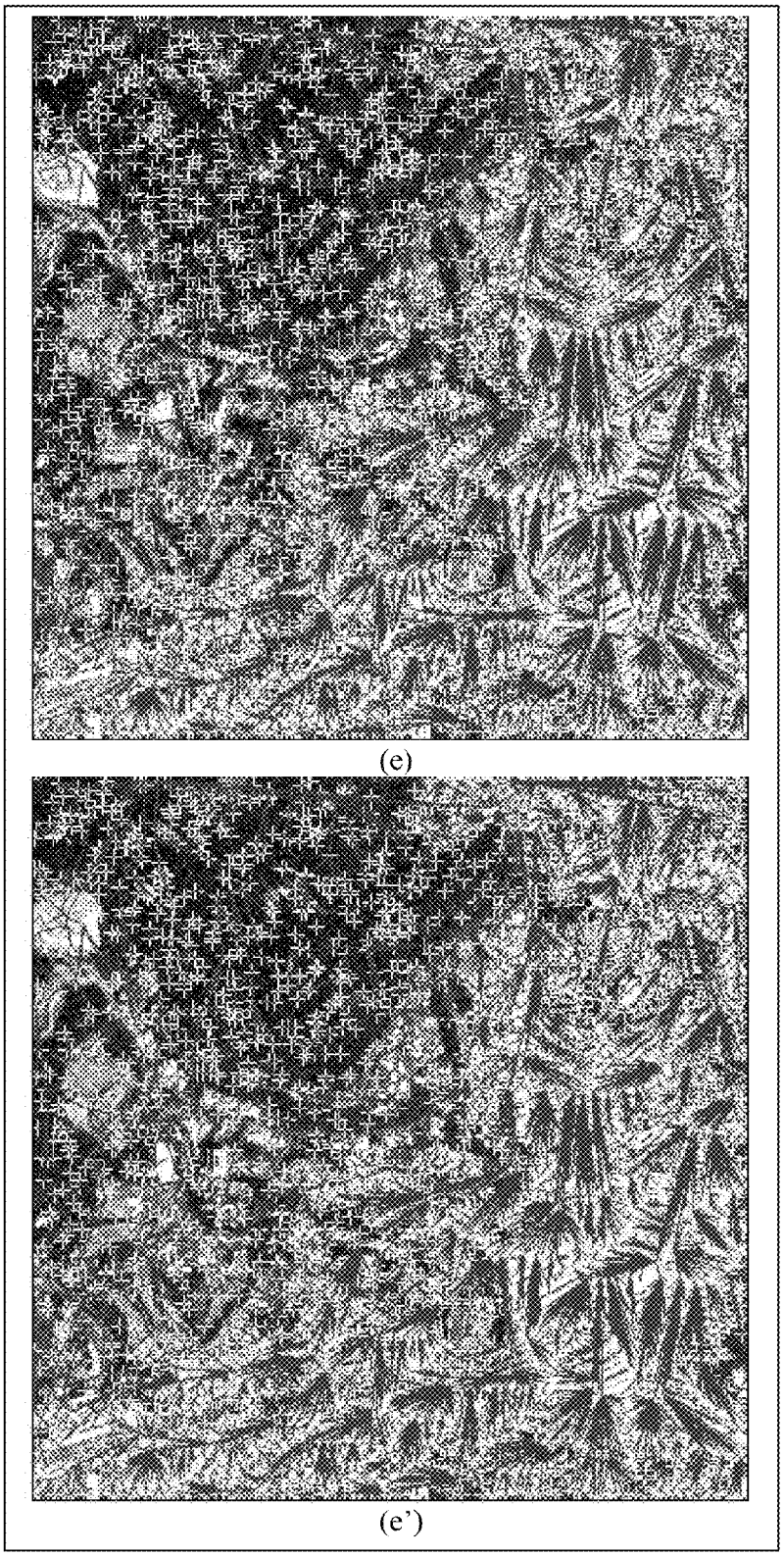
FIG. 19 is a set of images showing the result of interest point matching corresponding to the image pair (e) and (e') of FIG. 18 according to an embodiment of the method of the invention.

FIG. 19 shows the results of interest point matching corresponding to the image pair from FIGS. 18 (e) and (e'). There are 5674 correspondences in total.

Figure 20:
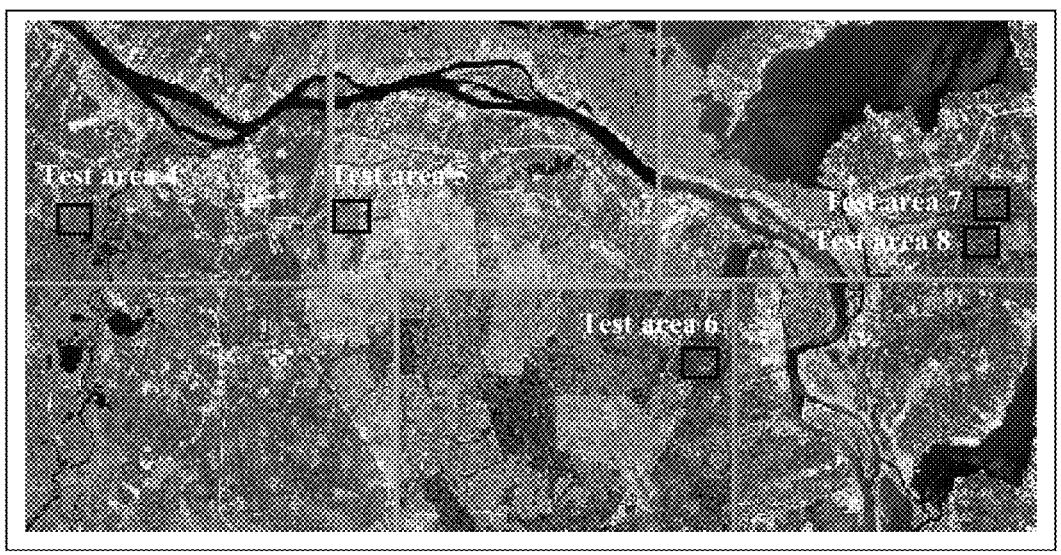
FIG. 20 is a set of QuickBird images of five test areas in Fredericton, New Brunswick, Canada.
Figure 21:
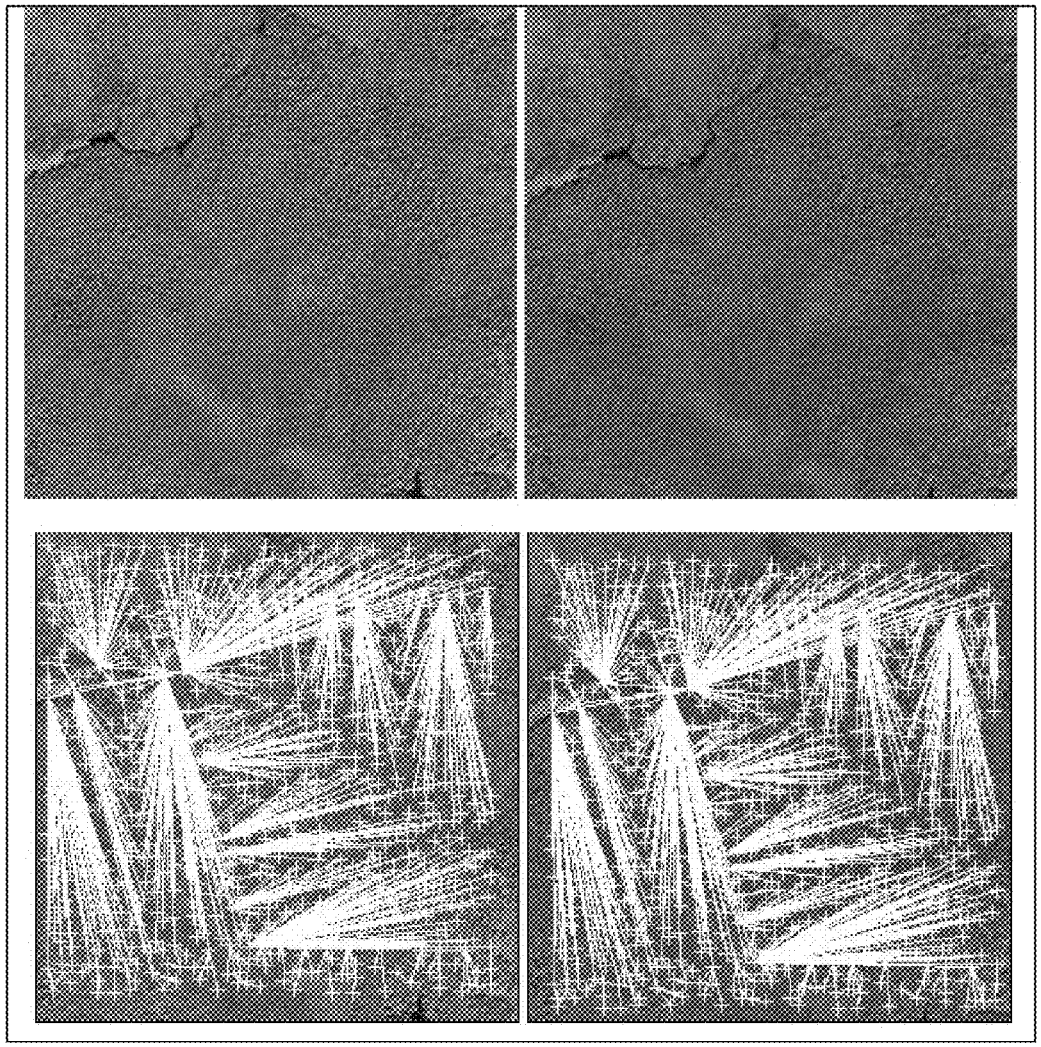
FIG. 21 is a set of images showing the result of interest point matching in Test Area 4 according to an embodiment of the method of the invention.
Figure 22:
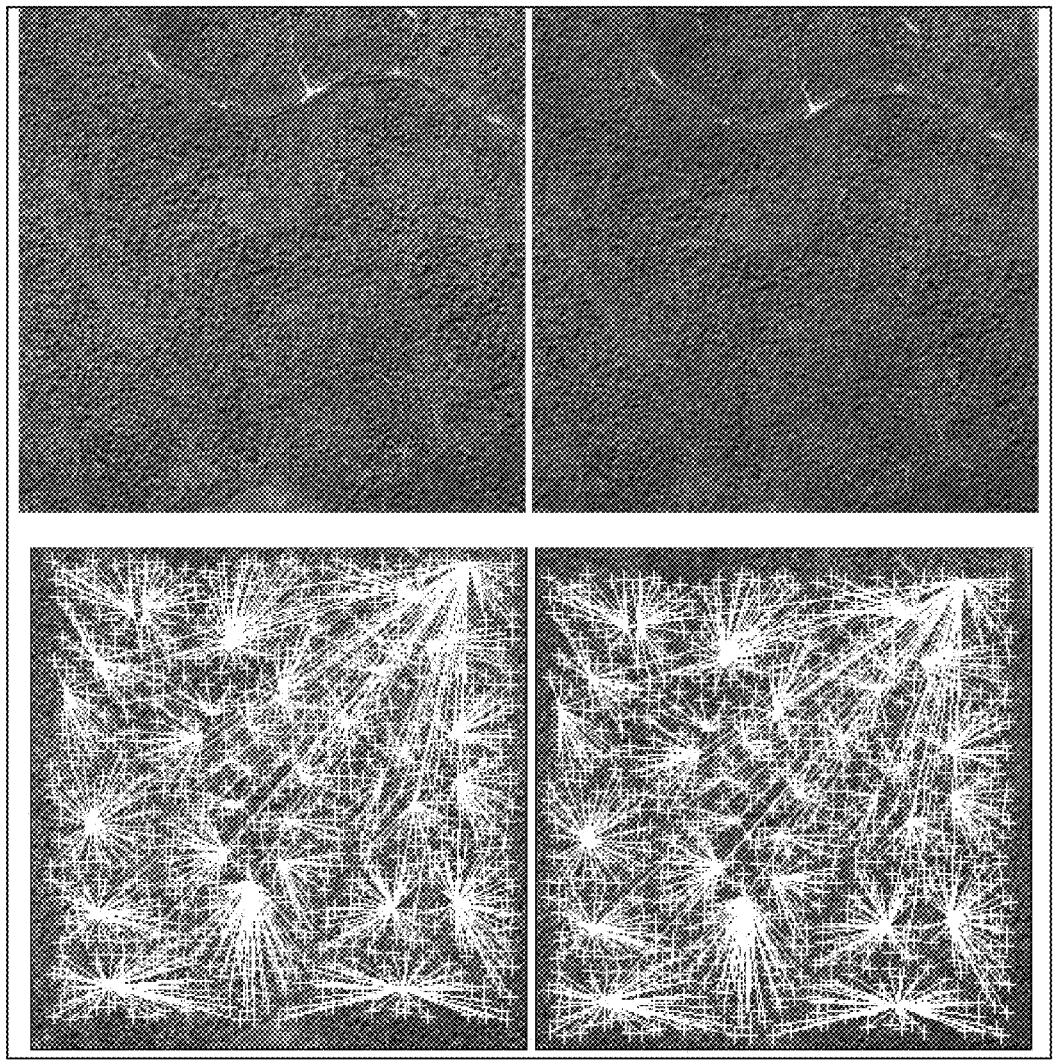
FIG. 22 is a set of images showing the result of interest point matching in Test Area 5 according to an embodiment of the method of the invention.
Figure 23:
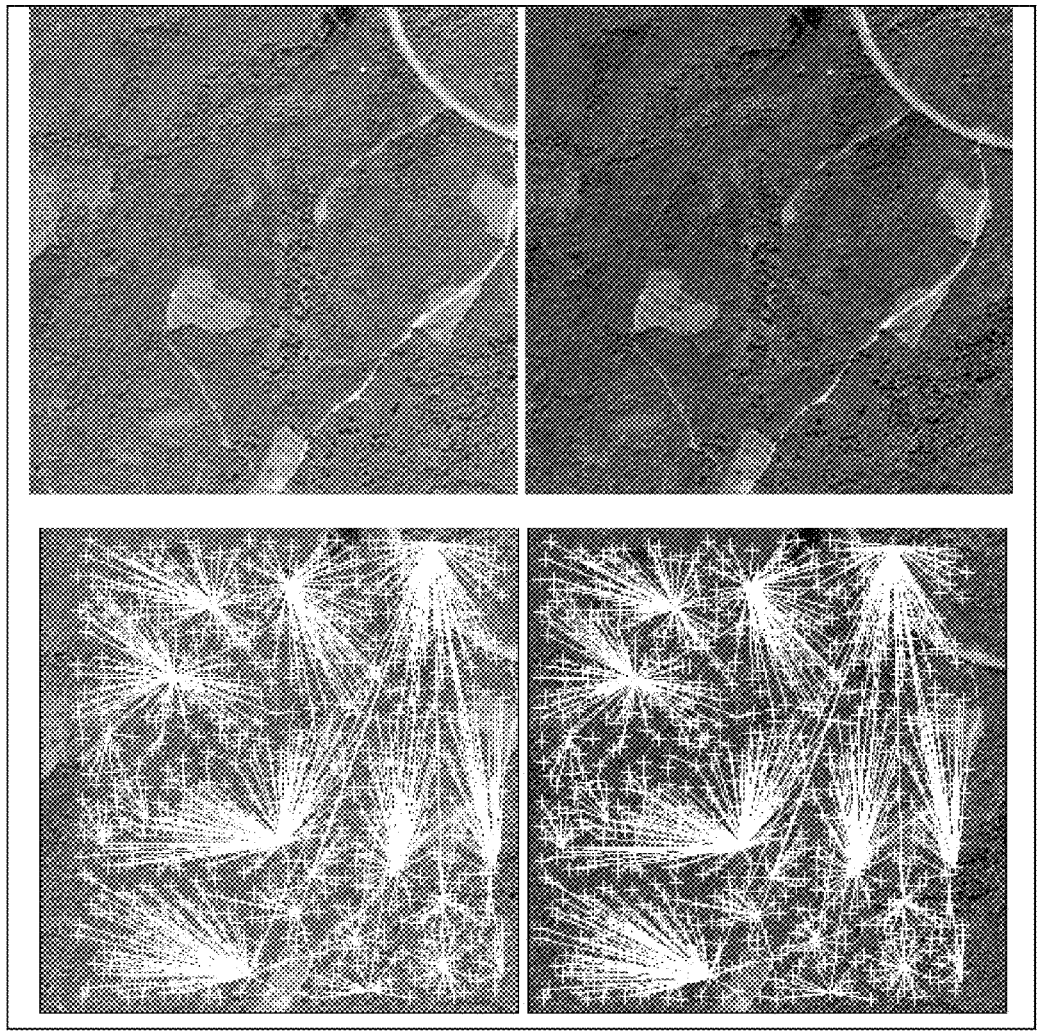
FIG. 23 is a set of images showing the result of interest point matching in Test Area 6 according to an embodiment of the method of the invention.
Figure 24:
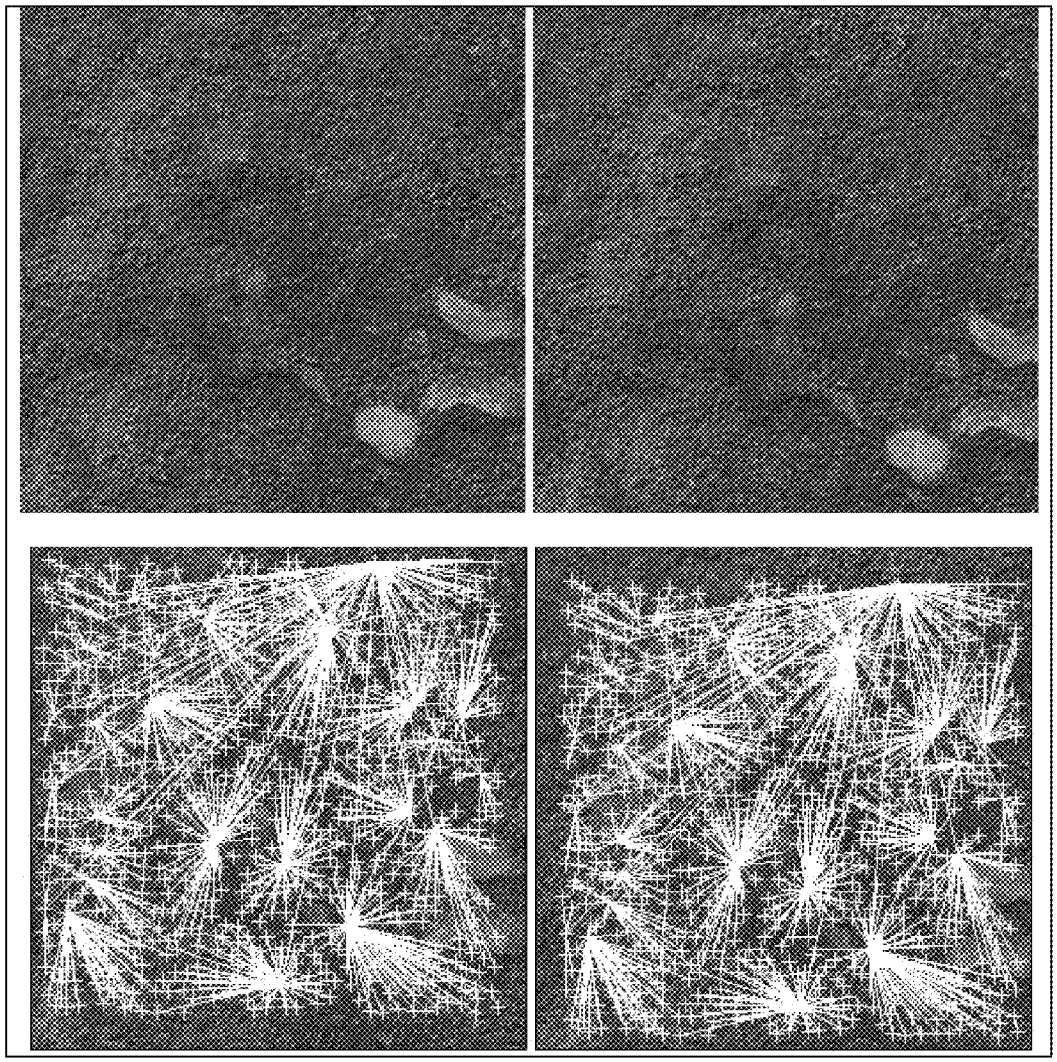
FIG. 24 is a set of images showing the result of interest point matching in Test Area 7 according to an embodiment of the method of the invention.
Figure 25:
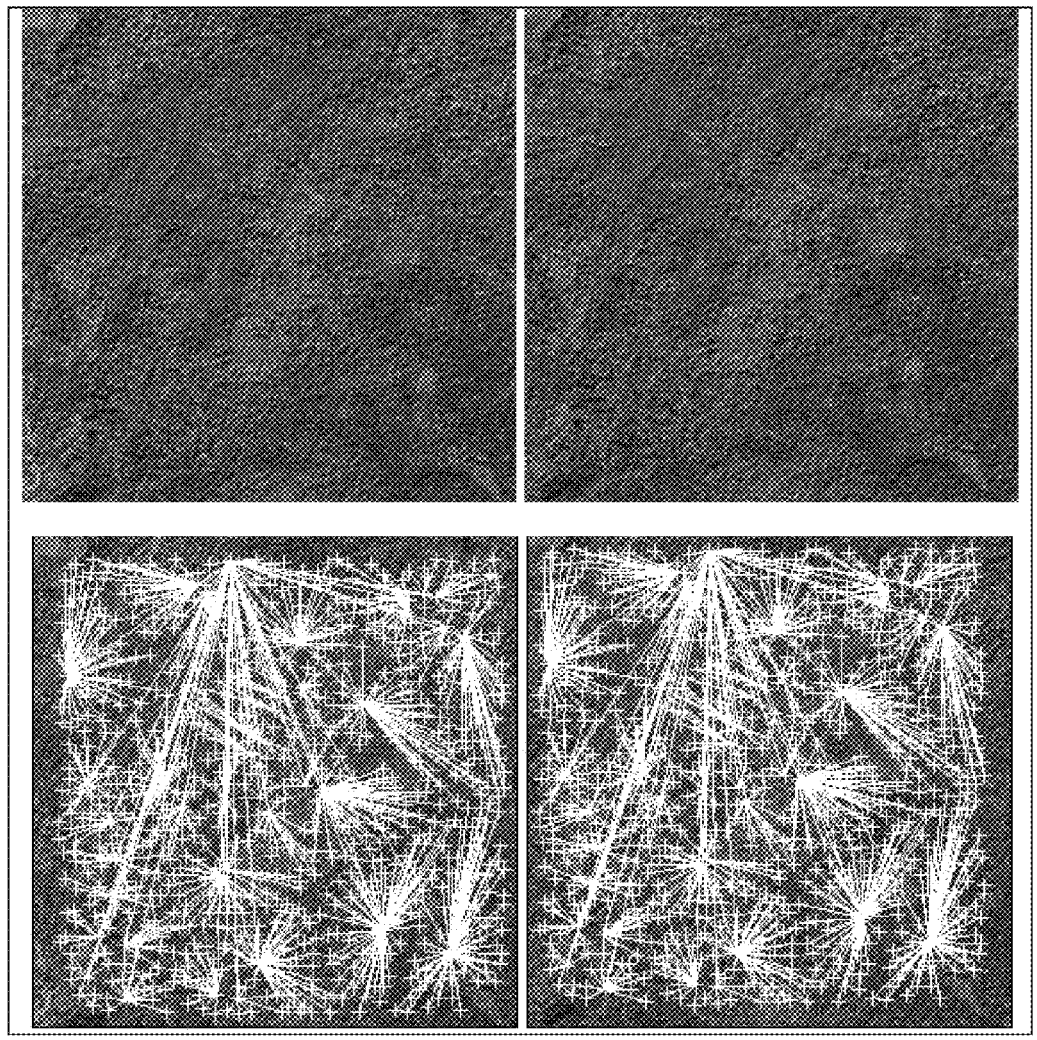
FIG. 25 is a set of images showing the result of interest point matching in Test Area 8 according to an embodiment of the method of the invention.

Test Data 4:

In order to test the proposed algorithm, five test areas shown in FIG. 20, which are located in the densest forestry region of Fredericton, New Brunswick, Canada, are chosen to challenge the capability of dealing with the ambiguity problem in the homogeneous area. Six scenes of QuickBird images cover the test field. All test image pairs are selected in the overlapping area. The corresponding results of interest point matching are illustrated in FIGS. 21 to 25 respectively. In FIG. 21, 813 correspondences are obtained in Test Area 4. In FIG. 22, 929 correspondences are obtained in Test Area 5. In FIG. 23, 759 correspondences are obtained in Test Area 6. In FIG. 24, 857 correspondences are obtained in Test Area 7. In FIG. 25, 875 correspondences are obtained in Test Area 8.

All the experiments illustrated satisfactory results without any false matches. Even in the smooth areas (e.g. a large area of grassland), this algorithm avoided false matches efficiently. In addition, because each interest point is assigned a unique position and angle with regard to its closest control point, its correspondence is searched only within the corresponding sub-control network, thus the process of interest point matching is very fast. By using an IBM (processor 1.70 GHz, 1.69 GHz, 768 MB of RAM), each experiment took only a few seconds.

Images Taken with an Ordinary Digital Camera

Figure 26:
FIGS. 26 and 27 are a set of images taken with a standard digital camera.
Figure 27:
Figure 28:
FIGS. 28 and 29 are the set of images of FIGS. 26 and 27 showing the result of interest point matching according to an embodiment of the invention.
Figure 29:
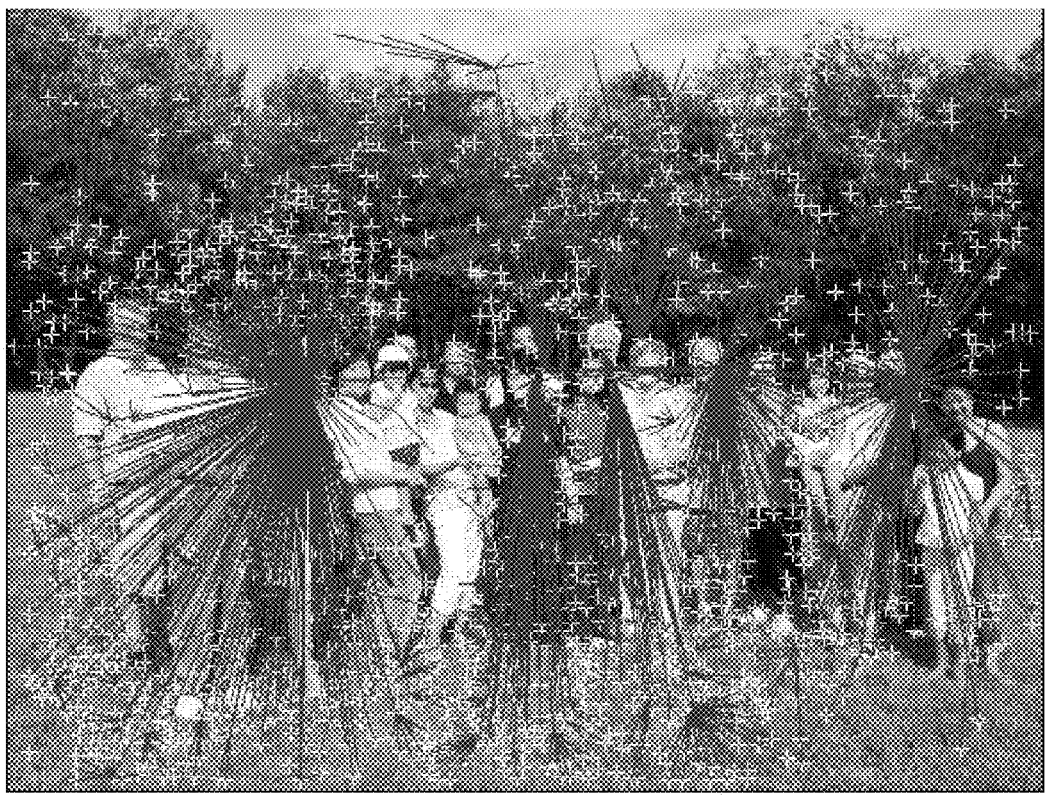

FIGS. 26 and 27 together form an image pair taken with a convention digital camera. A method of interest point matching according to the present invention was applied to the images. Correspondences found using methods according to the invention are shown in FIGS. 28 and 29.

Methods of the invention can be used to match images for example for mosaicing images and for overlaying of images for change detection analysis.

The success of the algorithm embodied in this invention depends on the control network. On one hand, the control network incorporates the spatial information and easily overcomes the problem of ambiguity in the homogeneous area. On the other hand, if the first group of correspondences from the super point matching is wrong, then all the other correspondences extracted based on this control network later on will also be false. This may be the main concern for this algorithm. However, for every different image, the control network of super points is almost always unique, except that there is not any prominent texture in the image and the whole image is homogeneous or filled with man-made texture. Therefore, this algorithm does not work in the complete homogeneous area, such as the area covered by snow, water, or sand. Fortunately, a complete homogeneous image is extremely rare.

The method described above may be embodied in sequences of machine-executable instructions which, when executed by a machine, cause the machine to perform the actions of the method. The machine that executes the instructions may be a general-purpose or special-purpose processor. By way of example, the machine-executable instructions may be stored on a number of machine-readable media, such as CD-ROMs or other types of optical disks, floppy diskettes, ROMs, RAMs, EPROMs, EEPROMs, magnetic or optical cards, flash memory, or other types of machine-readable media that are suitable for storing electronic instructions. The methods disclosed herein could also be performed by a combination of both hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

References

Auer, Matin, Peter Regitnig, and Gerhard A. Holzapfel. (2005). "An Automatic Nonrigid Registration for Stained Histological Sections." *IEEE Transactions on Image Processing*, Vol. 14, No. 4, April 2005.

Belongie, Serge, Jitendra Malik, and Jan Puzicha. (2002). "Shape matching and object recognition using shape contexts." *IEEE transactions on pattern analysis and machine intelligence*, Vol. 24.

Besl, Paul J., and Neil D. McKay. (1992). "A Method for Registration of 3-D Shapes." *IEEE Transactions on Pattern Analysis and Machine Intelligence*, Vol. 14, No. 2.

Boffy, Aurelien, Yanghai Tsin, and Yakup Genc. (2008). "Real-Time Feature Matching Using Adaptive and Spatially Distributed Classification Trees." http://www.macs.hw.ac.uldbmvc2006/papers/397.pdf. Last date accessed: Aug. 14, 2008.

Booksten, Fred L. (1989). "Principal Warps: Thin-Plate Splines and the Decomposition of Deformations." *IEEE Transactions on Pattern Analysis and Machine Intelligence*, Vol. 11, No. 6.

Brown, Lisa Gottesfeld. (1992). "A survey of image registration techniques." *ACM Computing Surveys*. Vol. 24, No. 4.

Caetano, Tiberio S., Terry Caelli, and Dante A. C. Barone. (2004). "A Comparison of Junction Tree and Relaxation Algorithms for Point Matching Using Different Distance Metrics." *Technical Report TR* 04-04, February 2004, Department of Computer Science, University of Alberta.

Chui, Haili and Anand Rangarajan. (2003). "A New Point Matching Algorithm for Non-Rigid Registration." *Computer Vision and Image Understanding* 89 (2003) 114-141.

Cross, Andrew D. J. and Edwin R. Hancock. (1998). "Graph Matching With a Dual-Step EM Algorithm." *IEEE Transactions on Pattern Analysis and Machine Intelligence*, Vol. 20, No. 11, November 1998.

Demirci, M. Fatih, Ali Shokoufandeh, Sven Dickinson, Yakov Keselman, and Lars Bretzner. (2004). "Many-to-Many Feature Matching Using Spherical Coding of Directed Graphs." T. Pajdla and J. Matas (Eds.): ECCV 2004, LNCS 3021, pp. 322-335.

Dowman I. J. (1977). "Developments in Online Techniques for Photogrammetry and Digital Mapping." *Photogrammetric Record*, 9(49): 41-54.

Gold, Steven and Anand Rangarajan. (1996). "A Graduated Assignment Algorithm for Graph Matching." *IEEE Transactions on Pattern Analysis and Machine Intelligence*, Vol. 18, No. 4.

Gold, Steven, Anand Rangarajan, Chien-Ping Lu, Suguna Pappu, and Eric Mjolsness. (1997). "New Algorithms for 2D and 3D Point Matching: Pose Estimation and Correspondence." URL: http://citeseerx.ist.psu.edu/legacymapper?did=88372, Accessed: Aug. 14, 2008.

Gupta, Rajiv. (1997). "Linear Pushbroom Cameras." *IEEE Transactions on Pattern Analysis and Intelligence*, VOL. 19, NO. 9, 1997.

Habib, Ayman and Rami Ai-Ruzouq. (2005). "Semi-Automatic Registration of Multi-Source Satellite Imagery with Varying Geometric Resolutions." *Photogrammetric Engineering & Remote Sensing*, Vol. 71, No. 3, pp. 325-332.

Harris C. and Stephens M. (1988). "*A combined corner and edge detector.*" Alvey Vision Conference, pages 147-151.

Helava, Uuno V., Chapelle, Walter E., Hornbuckle, John A. (1973). "Stereoplotting apparatus for correlating image points disposed along epipolar lines." U.S. Pat. No. 3,726,591, Apr. 10, 1973.

Kim, Taejung. (2000). "A Study on the Epipolarity of Linear Pushbroom Images."*Photogrammetric Engineering & Remote Sensing*, VOL. 66, NO. 8, August 2000, 961-966.

Kybic, Jan, and Michael Unser. (2003). "Fast Parametric Elastic Image Registration." *IEEE Transactions on Image Processing*, Vol. 12, No. 11, November 2003.

Lepetit, Vincent, Julien Pilet, and Pascal Fua. (2004). "Point Matching as a Classification Problem for Fast and Robust Object Pose Estimation." http://cvlab.epfl.cht~vlepetit/papers/lepetit cvpr04.pdf. Last date accessed: Aug. 14, 2008.

Lepetit, Vincent, Pascal Lagger, and Pascal Fua. (2005). "Randomized Trees for Real-Time Keypoint Recognition." *Computer Vision and Pattern Recognition*, 2005. Volume: 2, 775-781 vol. 2.

Lowe, David G. (2004). "Distinctive Image Features from Scale-Invariant Keypoints." *International Journal of Computer Vision* 60(2), 91-110.

Masry, S. E. (1972). "An Automatic Method for Height Profile Determination." *The Photogrammetric Record*, Volume 7 Issue 42, Pages 728-730.

Mount, David M., Nathan S. Netanyahu, and Jacqueline Le Moigne. (1997). "Efficient Algorithms for Robust Feature Matching." *Proceedings of the CESDIS Image Registration Workshop*, NASA Goddard Space Flight Center, Greenbelt, M D, 1997.

Rexilius, J., S. K. Warfield, C. R. G. Guttmann, X. Wei, R. Benson, L. Wolfson, M. Shenton, H. Handels, and R. Kikinis. (2001). "A Novel Nonrigid Registration Algorithm and Applications." W. Niessen and M. Viergever (Eds.): MICCAI 2001, LNCS 2208, pp. 923-931.

Schmid, Cordelia, Roger Mohr and Christian Bauckhage. (2000). "Evaluation of Interest Point Detectors." *International Journal of Computer Vision* 37(2), 151-172.

Shokoufandeh, Ali, Yakov Keselman, Faith Demirci, Diego Macrini, and Sven Dickinson. (2006). "Many-to-Many Feature Matching in Object Recognition." H. I. Christensen and H.-H. Nagel (Eds.): Cognitive Vision Systems, LNCS 3948, pp. 107-125.

Terasawa, Kengo, Takeshi Nagasaki, and Toshio Kawashima. (2005). "Robust Matching Method for Scale and Rotation Invariant Local Descriptors and Its Application to Image Indexing." G. G. Lee et al. (Eds.): AIRS 2005, LNCS 3689, pp. 601-615.

Tu, Zhuowen, Songfeng Zheng, and Alan Yuille. (2008). "Shape Matching and Registration by Data-Driven EM." *Computer Vision and Image Understanding*, 109 (2008) 290-304.

Williams, John and Mohammed Bennamoun. (2001). "Simultaneous Registration of Multiple Corresponding Point Sets." *Computer Vision and Image Understanding* 81, 117-142 (2001).

Yang, Gehua, Charles V. Steward, Michal Sofka, and Chia-Ling Tsai. (2007). "Registration of Challenging Image Pairs: Initialization, Estimation, and Decision." *IEEE Transactions on Pattern Analysis and Machine Intelligence*, Vol. 29, No. 11.

Zhao, Wanlei, Yugang Jiang, and Chong-Wah Ngo. (2006). "Keyframe Retrieval by Keypoints: Can Point-to-Point Matching Help?" H. Sundaram et al. (Eds.): CIVR 2006, LNCS 4071, pp. 72-81.

Zitova, Barbara, Jan Flusser. (2003). "Image Registration Methods: a Survey." *Image and Vision Computing* 21 (2003)977-1000.

We claim:

1. A computer implemented method for point matching comprising:
   (a) providing a stereo pair of digital images;
   (b) selecting a first set of interest points from a first image of the stereo pair and a second sets of interest points from a second images of the stereo pair;
   (c) selecting super points from each set of interest points wherein the super points are interest points which have an interest strength greater than a specified threshold;
   (d) searching for conjugate points to the super points, wherein a conjugate point comprises a point in a corresponding image of the stereo pair having an interest strength greater than the specified threshold;
   (e) constructing a control network using super points for which conjugate points have been located in step (d), each such super point being called a control network point;
   (f) assigning a position, with respect to the closest control network point, to interest points in each set which are not control network points;
   (g) searching for conjugate points to the interest points whose position, assigned in step (f), is closest to a control network point; and
   (h) adding interest points, for which a conjugate point has been located in step (g), to the control network.

2. The method of claim 1 further comprising repeating steps (f) to (g) for other points on the images.

3. The method of claim 1 wherein the conjugate points are tie points.

4. The method of claim 1 wherein in step (f) the assigning a position comprises assigning a relative position and angle relative to the closest super point.

5. A computer implemented method for point matching comprising:
   (a) providing a pair of images captured;
   (b) selecting first and second sets of interest points from the images;
   (c) constructing a control network of super points for each set of interest points;
   (d) assigning a position, with respect to the closest network control point of each control network, to other interest points on the images;
   (e) locating conjugate points for each other interest point of each set based on its assigned position;
   (f) adding the conjugate points to the control network, wherein the conjugate points are tie points;
   selecting a first start point and a first root point from the first set wherein the other points of the first set are leaf points;
   calculating a first distance between the first start point and the first root point;
   selecting a second start point and a second root point from the second set wherein the second start point and the second root point are selected such that the distance between them is closest to the first distance;
   and wherein assigning a position to the other points comprises:
   assigning a relative position and angle to each other point (leaf point) of each network by
   calculating a distance between each leaf point of the set and the root point of the set; and
   calculating for each leaf point of the set, an angle from a line formed by the start point of the set and the root point of the set, to a line formed by the leaf point and the root point of the set
   for each control network, grouping each interest point from a set with the closest node of the control network by:
   constructing a sub-control network for each network with the closest node and the interest points grouped with the node; and,
   conducting interest point matching between the two sub-control networks.

6. The method of claim 5 further comprising selecting the interest points with the smallest relative position and angle as tie points.

7. The method of claim 6 wherein the selecting of the sets of interest points comprises using a Harris algorithm.

* * * * *